(12) United States Patent
Fujimoto

(10) Patent No.: US 7,831,514 B2
(45) Date of Patent: Nov. 9, 2010

(54) METHOD FOR MANAGING LICENSE OF SOFTWARE PROGRAM IN STORAGE SYSTEM

(75) Inventor: Shuji Fujimoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1092 days.

(21) Appl. No.: 10/651,536

(22) Filed: Aug. 29, 2003

(65) Prior Publication Data

US 2004/0153416 A1   Aug. 5, 2004

(30) Foreign Application Priority Data

Jan. 31, 2003   (JP)   ............... 2003-025075

(51) Int. Cl.
*G06F 1/00*   (2006.01)
*G06F 21/00*   (2006.01)
(52) U.S. Cl. ........................................ 705/59; 709/221
(58) Field of Classification Search ................. 709/221, 709/224; 705/59
See application file for complete search history.

(56) References Cited

U.S. PATENT DOCUMENTS

| | | |
|---|---|---|
| 4,046,382 A | 9/1977 | Ratzkoff |
| 4,305,586 A | 12/1981 | Richards |
| 4,455,025 A | 6/1984 | Itkis |
| 4,856,787 A | 8/1989 | Itkis |
| 5,098,107 A | 3/1992 | Boylan et al. |
| 5,139,270 A | 8/1992 | Gernhofer |
| 5,155,845 A | 10/1992 | Beal et al. |
| 5,257,784 A | 11/1993 | Boylan et al. |
| 5,265,877 A | 11/1993 | Boylan et al. |
| 5,393,057 A | 2/1995 | Marnell, II |
| 5,449,179 A | 9/1995 | Hefferan |
| 5,544,347 A | 8/1996 | Yanai et al. |
| 5,574,863 A | 11/1996 | Nelson et al. |
| 5,579,222 A * | 11/1996 | Bains et al. .................. 717/167 |
| 5,605,333 A | 2/1997 | Field |
| 5,636,341 A | 6/1997 | Matsushita et al. |
| 5,651,735 A | 7/1997 | Baba |
| 5,668,943 A | 9/1997 | Attanasio et al. |
| 5,671,412 A * | 9/1997 | Christiano ............... 707/104.1 |
| 5,720,028 A | 2/1998 | Matsumoto et al. |
| 5,729,763 A | 3/1998 | Leshem |

(Continued)

FOREIGN PATENT DOCUMENTS

JP   2002-279165   9/2002

OTHER PUBLICATIONS

U.S. Appl. No. 10/649,100, unpublished, filed Aug. 26, 2003, Fujimoto.

(Continued)

*Primary Examiner*—Evens J Augustin
(74) *Attorney, Agent, or Firm*—Townsend and Townsend and Crew LLP

(57) ABSTRACT

In a storage system, a judgment is made as to whether respective programs installed in storage regions assigned to a plurality of channel control portions exchanging data input/output requests based on designated filenames with information processors connected to the storage system through a network are licensed or not. When a decision is made that the respective programs are licensed, the programs installed in the channel control portions in the storage system are managed to be controlled to be enabled to be used.

4 Claims, 18 Drawing Sheets

U.S. PATENT DOCUMENTS

| | | |
|---|---|---|
| 5,752,041 A | 5/1998 | Fosdick |
| 5,774,643 A | 6/1998 | Lubbers et al. |
| 5,803,460 A | 9/1998 | Hesse |
| 5,815,652 A | 9/1998 | Ote et al. |
| 5,819,054 A | 10/1998 | Ninomiya et al. |
| 5,845,061 A | 12/1998 | Miyamoto et al. |
| 5,903,650 A * | 5/1999 | Ross et al. .................... 705/59 |
| 5,935,001 A | 8/1999 | Baba |
| 5,957,457 A | 9/1999 | Shaw |
| 6,009,401 A * | 12/1999 | Horstmann .................... 705/1 |
| 6,169,976 B1 | 1/2001 | Colosso |
| 6,189,146 B1 * | 2/2001 | Misra et al. ................. 717/177 |
| 6,243,829 B1 | 6/2001 | Chan |
| 6,356,978 B1 | 3/2002 | Kobayashi et al. |
| 6,397,292 B1 | 5/2002 | Venkatesh et al. |
| 6,401,223 B1 | 6/2002 | DePenning |
| 6,408,400 B2 | 6/2002 | Taketa et al. |
| 6,416,406 B1 | 7/2002 | Duhamel |
| 6,450,500 B1 | 9/2002 | Miller |
| 6,523,138 B1 | 2/2003 | Natsume et al. |
| 6,539,461 B2 | 3/2003 | Suzuki et al. |
| 6,574,612 B1 * | 6/2003 | Baratti et al. ................. 705/59 |
| 6,581,935 B1 | 6/2003 | Odom |
| 6,633,835 B1 * | 10/2003 | Moran et al. ................. 702/190 |
| 6,732,289 B1 | 5/2004 | Talagala et al. |
| 6,745,287 B2 * | 6/2004 | Fujimoto et al. ............ 711/114 |
| 6,766,359 B1 | 7/2004 | Oliveira et al. |
| 6,772,306 B2 | 8/2004 | Suzuki et al. |
| 6,789,112 B1 * | 9/2004 | Freeman et al. ............. 709/223 |
| 6,801,940 B1 * | 10/2004 | Moran et al. ................. 709/224 |
| 6,801,983 B2 | 10/2004 | Abe et al. |
| 6,851,020 B2 | 2/2005 | Matsumoto et al. |
| 6,874,100 B2 | 3/2005 | Rauscher |
| 2001/0004754 A1 | 6/2001 | Murayama et al. |
| 2001/0049717 A1 * | 12/2001 | Freeman et al. ............. 709/203 |
| 2002/0069172 A1 | 6/2002 | Omshehe et al. |
| 2002/0124140 A1 | 9/2002 | Kawaguchi et al. |
| 2002/0188704 A1 * | 12/2002 | Gold et al. ................. 709/221 |
| 2002/0198037 A1 | 12/2002 | Moody |
| 2003/0018927 A1 | 1/2003 | Gadir et al. |
| 2003/0037278 A1 | 2/2003 | Olarig |
| 2003/0064772 A1 | 4/2003 | Tempest et al. |
| 2003/0064790 A1 | 4/2003 | Hughs-Baird et al. |
| 2003/0084306 A1 * | 5/2003 | Abburi et al. ............... 713/188 |
| 2003/0135782 A1 | 7/2003 | Matsunami et al. |
| 2003/0163712 A1 * | 8/2003 | LaMothe et al. ........... 713/189 |
| 2003/0204597 A1 | 10/2003 | Arakawa et al. |
| 2004/0049710 A1 | 3/2004 | Ashmore et al. |
| 2004/0054930 A1 * | 3/2004 | Walker et al. ............... 713/202 |
| 2004/0098348 A1 * | 5/2004 | Kawasaki et al. ............. 705/59 |
| 2004/0133634 A1 | 7/2004 | Luke |
| 2004/0153914 A1 | 8/2004 | El-Batal |
| 2004/0178579 A1 | 9/2004 | Lowell et al. |
| 2004/0185931 A1 | 9/2004 | Lowell et al. |

OTHER PUBLICATIONS

U.S. Appl. No. 10/651,559, unpublished, filed Aug. 29, 2003, Fujimoto.

* cited by examiner

PHYSICAL DISK MANAGEMENT TABLE

162a

| DISK NUMBER | CAPACITY | RAID | STATUS OF USE |
|---|---|---|---|
| #001 | 100GB | 5 | IN USE |
| #002 | 100GB | 5 | IN USE |
| #003 | 100GB | 5 | IN USE |
| #004 | 100GB | 5 | IN USE |
| #005 | 100GB | 5 | IN USE |
| #006 | 50GB | — | UNUSED |
| ⋮ | ⋮ | ⋮ | ⋮ |

LU MANAGEMENT TABLE

162b

| LU NUMBER | PHYSICAL DISK | CAPACITY | RAID |
|---|---|---|---|
| #1 | #001,#002,#003,#004,#005 | 100GB | 5 |
| #2 | #001,#002,#003,#004,#005 | 300GB | 5 |
| #3 | #006,#007, | 200GB | 1 |
| ⋮ | ⋮ | ⋮ | ⋮ |

FIG. 15

| SYSTEM IDENTIFIER | CLUSTER IDENTIFIER | NAS IDENTIFIER | PROGRAM IDENTIFIER | PROGRAM TYPE | VERSION | STATUS OF USE |
|---|---|---|---|---|---|---|
| SYSTEM 1 | CLUSTER A | CHN 1 | PROGRAM 1 | ESSENTIAL | 1.0 | — |
| | | | PROGRAM 2 | ARBITRARY | 1.1 | ENABLE |
| | | | PROGRAM 3 | ARBITRARY | 1.0 | DISABLE |
| SYSTEM 1 | CLUSTER A | CHN 2 | PROGRAM 1 | ESSENTIAL | 1.0 | — |
| | | | PROGRAM 2 | ARBITRARY | 1.1 | ENABLE |
| | | | PROGRAM 3 | ARBITRARY | 1.0 | DISABLE |
| SYSTEM 1 | CLUSTER B | CHN 3 | PROGRAM 1 | ESSENTIAL | 1.0 | — |
| | | | PROGRAM 2 | ARBITRARY | 1.1 | DISABLE |
| | | | PROGRAM 4 | ARBITRARY | 1.2 | ENABLE |
| SYSTEM 1 | CLUSTER B | CHN 4 | PROGRAM 1 | ESSENTIAL | 1.0 | — |
| | | | PROGRAM 2 | ARBITRARY | 1.1 | DISABLE |
| | | | PROGRAM 4 | ARBITRARY | 1.2 | ENABLE |

FIG. 16

| SYSTEM IDENTIFIER | PROGRAM IDENTIFIER | VERSION | NUMBER OF LICENSES | NUMBER OF REMAINING LICENSES |
|---|---|---|---|---|
| SYSTEM 1 | PROGRAM 2 | 1.1 | 6 | 4 |
| | PROGRAM 3 | 1.0 | 0 | 0 |
| | PROGRAM 4 | 1.0 | 2 | 0 |

FIG. 17

| PROGRAM NAME | NUMBER OF REMAINING LICENSES | TYPE | STATUS |
|---|---|---|---|
| PROGRAM A | 2 | ARBITRARY | ENABLE |
| PROGRAM B | 0 | ARBITRARY | DISABLE |
| PROGRAM C | — | ESSENTIAL | — |
| | | | |
| | | | |

FIG. 23

| SYSTEM IDENTIFIER | CLUSTER IDENTIFIER | CHN IDENTIFIER | PROGRAM IDENTIFIER | PROGRAM TYPE | VERSION | STATUS OF USE |
|---|---|---|---|---|---|---|
| SYSTEM 1 | CLUSTER A | CHN 1 | PROGRAM 1 | ESSENTIAL | 1.0 | — |
|  |  |  | PROGRAM 2 | ARBITRARY | 1.1 | ENABLE |
|  |  |  | PROGRAM 3 | ARBITRARY | 1.0 | DISABLE |
| SYSTEM 1 | CLUSTER A | CHN 2 | PROGRAM 1 | ESSENTIAL | 1.0 | — |
|  |  |  | PROGRAM 2 | ARBITRARY | 1.1 | ENABLE |
|  |  |  | PROGRAM 3 | ARBITRARY | 1.0 | DISABLE |
| SYSTEM 1 | CLUSTER A | CHN 3 | PROGRAM 1 | ESSENTIAL | 1.0 | — |
|  |  |  | PROGRAM 2 | ARBITRARY | 1.1 | DISABLE |
|  |  |  | PROGRAM 3 | ARBITRARY | 1.2 | ENABLE |
| SYSTEM 1 | CLUSTER A | CHN 4 | PROGRAM 1 | ESSENTIAL | 1.0 | — |
|  |  |  | PROGRAM 2 | ARBITRARY | 1.1 | DISABLE |
|  |  |  | PROGRAM 3 | ARBITRARY | 1.2 | ENABLE |

FIG. 24

> MISMATCH OF PROGRAM STATES
>
> THE PROGRAM STATES OF THE CHANNEL CONTROL PORTIONS IN THE CLUSTER SYSTEM WERE NOT UNIFORM.
>
> [ OK ]

METHOD FOR MANAGING LICENSE OF SOFTWARE PROGRAM IN STORAGE SYSTEM

CROSS-REFERENCE TO RELATED APPLICATIONS

The invention relates to copending U.S. patent application Ser. Nos. 10/649,100 and 10/651,559, filed on Aug. 26, 2003 and Aug. 29, 2003, claiming priority under 35 U.S.C. 119 of Japanese Patent Applications Nos. 2003-025074 and 2003-025071, respectively.

BACKGROUND OF THE INVENTION

The quantity of data used in a computer system has increased rapidly in recent years. As a storage system for managing such data, a large-scale storage system combined with a file system and managed by a RAID (Redundant Arrays of Inexpensive Disks) method for providing huge storage resources as called mid-range class or enterprise class has attracted public attention recently. To use and manage such huge data efficiently, there has been developed a technique for connecting a storage system such as a disk array system to information processors by a private network (Storage Area Network, hereinafter referred to as SAN) to thereby achieve high-speed and large-volume access to the storage system. On the other hand, a storage system called NAS (Network Attached Storage) has been developed so that the storage system is connected to each information processor through a network using a protocol such as TCP/IP (Transmission Control Protocol/Internet Protocol) to achieve access at file level from the information processor. In such a storage system, license setting (registration) is generally required for validating an operating system or application program installed in a computer for the purpose of preventing illegal copy. When the number of programs installed is large or when the number of computers to be managed is large, the number of licenses to be managed increases inevitably. As a system for managing such licenses, there is known a system for re-registering licenses for installation programs used by changed staffs of a corporation or group, for example, in altering the organization or personnel changes in the corporation or group (e.g., JP-A-2002-279165).

SUMMARY OF THE INVENTION

Incidentally, a large number of programs such as a program for performing communications with information processors, a program for implementing a file system function, etc. are installed in the NAS. Therefore, particularly the NAS needs a system for efficiently managing licenses.

The invention is developed in consideration of the aforementioned problem and an object of the invention is to provide a storage system controlling method, a storage system and a program.

To solve the problem, a method for managing licenses in a storage system according to the invention is a method of controlling a storage system which includes channel control portions for exchanging data input/output requests based on designation of filenames with information processors connected to the storage system through a network, storage regions assigned to the channel control portions so as to be able to be accessed by the channel control portions respectively, and storage devices provided with the storage regions, the method including the steps of: installing a program to be executed by each of the channel control portions in each of the storage regions assigned to the channel control portions; judging whether or not licenses of the program installed in the storage regions assigned to the channel control portions are set for the channel control portions respectively; and performing control so that each of the channel control portions in the storage system can use the installed program when a decision is made that licenses of the installed program are set for the channel control portions respectively.

Incidentally, the information processors are, for example, personal computers or main frame computers that can access the storage system including the storage device controller configured as described above through an LAN or an SAN. The function of a file access processing portion is provided by an operating system executed on a CPU of each channel control portion and a program such as NFS (Network File System) operating on the operating system, or the like. Each of the storage devices is a disk drive such as a hard disk device or the like.

When a firmware or a program for implementing the function of the file access processing portion is installed in each storage device, the storage system can provide the function of an NAS to each information processor.

BRIEF DESCRIPTION OF THE DRAWINGS

FIG. 15 is a view showing an image of a license status information table explained as this embodiment;

FIG. 16 is a view showing an image of a license number information table explained as this embodiment;

FIG. 17 is a view showing an image of license information displayed on a display screen of an information processor;

FIG. 23 is a view showing an image of a program status table explained as this embodiment; and FIG. 24 is a view showing an image of an error message displayed on a display screen of a management terminal or information processor.

DETAILED DESCRIPTION OF THE EMBODIMENTS

The invention will be described below.

(Example of Overall Configuration)

Figure 1:
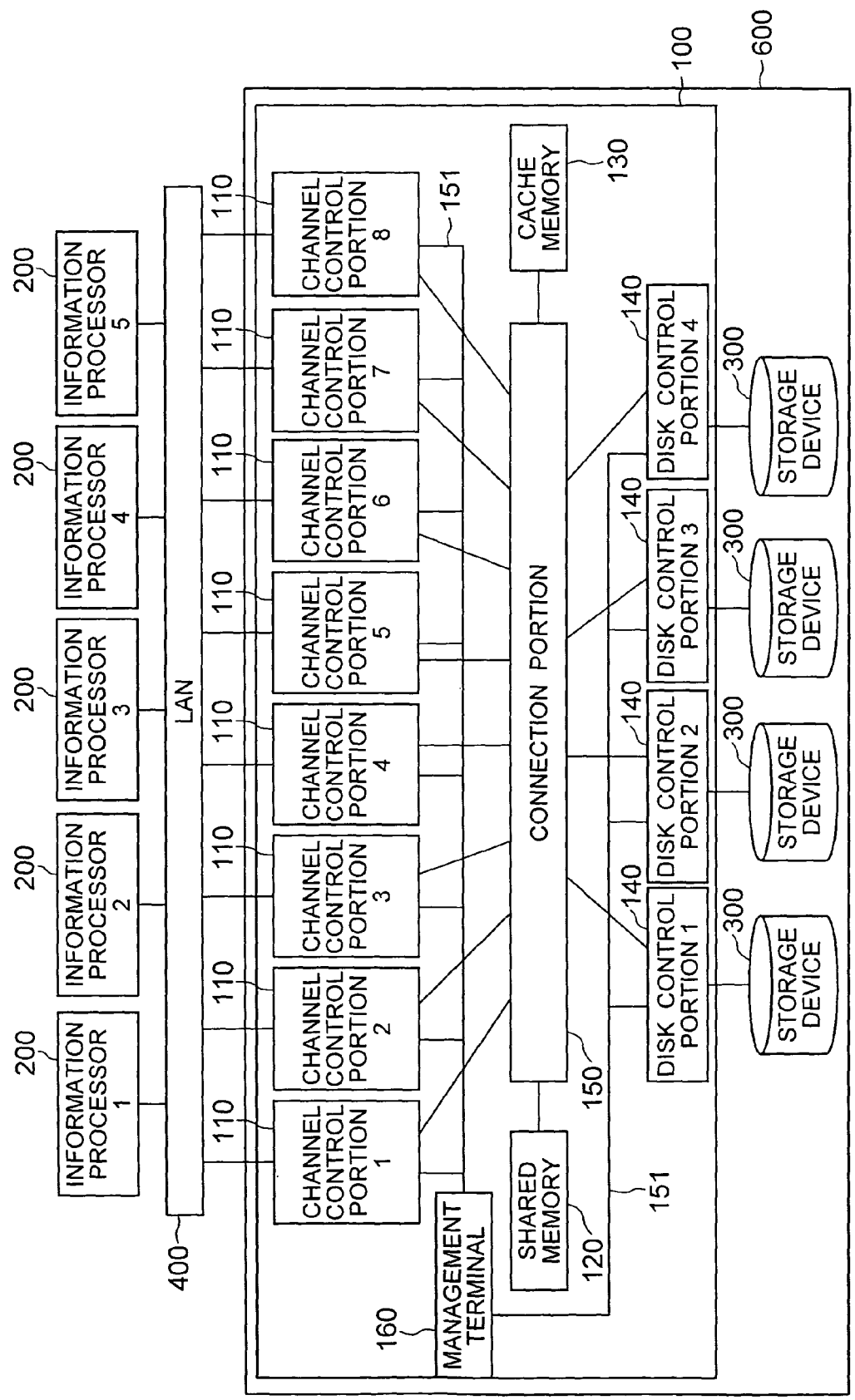
FIG. 1 is a block diagram showing the overall configuration of a storage system according to an embodiment of the invention.

FIG. 1 shows the overall configuration of a storage system having channel control portions explained as an embodiment of the invention. The storage system 600 includes a storage device controller 100, and storage devices (storage units) 300. The storage device controller 100 controls the storage devices 300 according to commands received from information processors 200. For example, upon reception of a data input/output request from a certain information processor 200, the storage device controller 100 performs processing for input/output of data stored in the storage devices 300. Data are stored in logical volumes (logical units) (hereinafter referred to as LUs) which are storage regions logically set on physical storage regions provided by disk drives contained in the storage devices 300. The storage device controller 100 exchanges various kinds of commands with the information processors 200 for managing the storage system 600.

Each of the information processors 200 is a computer that contains a CPU (Central Processing Unit), and a memory. The CPU contained in each information processor 200 executes various kinds of programs to implement various functions. For example, each information processor 200 may be a personal computer, a work station or a main frame computer.

In FIG. 1, the information processors 200 are connected to the storage device controller 100 through an LAN (Local Area Network) 400. The LAN 400 may be replaced by the Internet or by a private network. Communications between the information processors 200 and the storage device controller 100 through the LAN 400 are performed, for example, according to TCP/IP. The information processors 200 send requests for data access based on designated filenames (hereinafter referred to as file access requests) to the storage system 600.

The storage device controller 100 has channel control portions 110. The channel control portions 110 are hereinafter also referred to as CHNs. The storage device controller 100 uses the channel control portions 110 to communicate with the information processors 200 through the LAN 400. The channel control portions 110 individually accept file access requests from the information processors 200. That is, network addresses (e.g., IP addresses) on the LAN 400 are assigned to the channel control portions 110 respectively. Accordingly, the channel control portions 110 can serve as NASs respectively, so that the channel control portions 110 can provide NAS service to the information processors 200 as if the respective NASs were present as independent NASs. Because one storage system 600 is configured to include the channel control portions 110 for providing NAS service individually in the aforementioned manner, NAS servers that were heretofore operated by independent computers respectively can be collectively operated by a single storage system 600. This configuration permits the storage system 600 to perform general management, so that improvement in efficiency of maintenance transactions such as various kinds of setting/control and failure control, as well as license management and program management for existence of installation, program version, etc., can be attained.

Incidentally, the function of each of the channel control portions 110 in the storage device controller 100 according to this embodiment is implemented by a hardware formed on a circuit board integrated as a unit, an operating system (hereinafter referred to as OS) executed by the hardware and a program such as an application program operated on the OS etc., as will be described later. In this manner, in the storage system 600 according to this embodiment, the function which has been heretofore provided as part of hardware is mainly implemented by a program. For this reason, in the storage system 600 according to this embodiment, flexible system operation can be conducted to make it possible to provide delicate service meeting diversified and varied users' needs.

Although the above description has been made on the case where the storage system 600 is configured so that the storage device controller 100 is connected to the information processors 200 through the LAN (Local Area Network) 400, the invention may be also applied to the case where the storage system 600 is configured so that the storage device controller 100 is connected to the information processors 200 through an SAN (Storage Area Network). Or the storage system 600 may be configured so that the storage device controller 100 is connected to the information processors 200 without intermediation of any network such as the LAN 400, the SAN, or the like.

(Storage Devices)

The storage devices 300 have a large number of disk drives (physical disks) to provide storage regions to the information processors 200. Data are stored in LUs which are storage regions logically set on physical storage regions provided by the disk drives. As the disk drives, various devices such as hard disk devices, flexible disk devices and semiconductor storage devices can be used.

Incidentally, for example, the storage devices 300 may be used in such a manner that a disk array is constituted by a plurality of disk drives. In this case, the storage regions provided to the information processors 200 may be provided by a plurality of disk drives managed by RAID.

The storage devices 300 may be connected to the storage device controller 100 directly as shown in FIG. 1 or may be connected to the storage device controller 100 through a network. The storage devices 300 may be also integrated with the storage device controller 100.

The LUs (storage regions) set in the storage devices 300 include user LUs allowed to be accessed by the information processors 200, and system LUs used for control of the channel control portions 110. Each system LU also stores an operating system executed by a corresponding CHN 110. Application programs, data, etc. executed by the CHN 110 and required for providing NAS service are stored in each system LU. The channel control portions 110 are associated with LUs respectively. Accordingly, LUs are assigned to the channel control portions 110 so that the LUs can be accessed by the channel control portions 110 respectively. The association may be also made so that one LU is used in common with a plurality of channel control portions 110. Incidentally, the user LUs and the system LUs are hereinafter also referred to as user disks and system disks. The LU used in common with a plurality of channel control portions 110 is hereinafter referred to as shared LU or shared disk.

(Storage Device Controller)

The storage device controller 100 includes channel control portions 110, a shared memory 120, a cache memory 130, disk control portions 140, a management terminal 160, and a connection portion 150.

Each channel control portion 110 has a communication interface for communicating with the information processors 200. That is, each channel control portion 110 has a function for exchanging data input/output commands with the information processors 200. For example, a CHN 110 accepts file access requests from the information processors 200. The CHN 110 calculates storage addresses, data lengths, etc. of files and outputs I/O requests corresponding to the file access requests to thereby access the storage devices 300. In this manner, the storage system 600 can provide NAS service to the information processors 200. Incidentally, each I/O request contains a data top address, a data length, and an access type such as read or write. In the case of data write, data to be written may be contained in the I/O request. The I/O request is output from an I/O processor 119 that will be described later.

The channel control portions 110 and the management terminal 160 are connected to one another through an internal LAN 151. Accordingly, micro-programs etc. to be executed by the channel control portions 110 can be sent and installed from the management terminal 160. The configuration of each cannel control portion 110 will be described later.

The connection portion 150 connects the channel control portions 110, the shared memory 120, the cache memory 130 and the disk control portions 140 to one another. Exchange of data and commands among the channel control portions 110, the shared memory 120, the cache memory 130 and the disk control portions 140 is conducted through the connection portion 150. The connection portion 150 is a high-speed bus such as an ultra high-speed crossbar switch for performing data transmission by high-speed switching. Because the channel control portions 110 are connected to one another by the high-speed bus, performance of communications between the channel control portions 110 is improved greatly compared with a conventional configuration in which NAS servers operated on computers respectively are connected to one another through an LAN. In addition, the use of the high-speed bus makes a high-speed file sharing function, a high-speed fail-over function, etc. possible.

The shared memory 120 and the cache memory 130 are storage memories used in common with the channel control portions 110 and the disk control portions 140. The shared memory 120 is mainly used for storing control information, commands, etc. whereas the cache memory 130 is mainly used for storing data.

When, for example, the data input/output command received by a certain channel control portion 110 from a certain information processor 200 is a write command, the channel control portion 110 writes the write command in the shared memory 120 and further writes write data received from the information processor 200 in the cache memory 130. On the other hand, each disk control portion 140 monitors the shared memory 120. When a pertinent disk control portion 140 detects that the write command has been written in the shared memory 120, the disk control portion 140 reads the write data from the cache memory 130 and writes the write data in a pertinent storage device 300 in accordance with the command.

In addition, when the data input/output command received by a certain channel control portion 110 from a certain information processor 200 is a read command, the channel control portion 110 writes the read command in the shared memory 120 and checks whether data to be read is present in the cache memory 130 or not. When the data is present in the cache memory 130, the data is sent to the information processor 200. On the other hand, when the data to be read is not present in the cache memory 130, the disk control portion 140 monitoring the shared memory 120 so as to detect the writing of the read command in the shared memory 120 reads data as a subject of reading from a pertinent storage device 300, writes the data in the cache memory 130 and writes notification of the writing in the shared memory 120. When the channel control portion 110 monitors the shared memory 120 so as to detect the notification of the writing of the data as a subject of reading in the cache memory 130, the channel control portion 110 sends the data to the information processor 200.

Incidentally, as an alternative to the configuration in which instructions given from the channel control portions 110 to the disk control portions 140 to write or read data are conducted indirectly with intermediation of the shared memory 120 in this manner, there may be adopted, for example, another configuration in which instructions given from the channel control portions 110 to the disk control portions 140 to write or read data are conducted directly without intermediation of the shared memory 120.

The disk control portions 140 control the storage devices 300 respectively. For example, the channel control portions 110 write data in the storage devices 300 according to the data write commands received from the information processors 200 in the aforementioned manner. When a request of data access to an LU based on a designated logical address is sent from a certain channel control portion 110 to a corresponding disk control portion 140, the disk control portion 140 converts the data access request into a request of data access to a physical disk based on a designated physical address. In the case where the physical disks in the storage devices 300 are managed by RAID, data access is made according to the RAID configuration (e.g., RAID0, RAID1 or RAID5). The disk control portions 140 perform duplicating management control and backup control of data stored in the storage devices 300. In addition, the disk control portions 140 perform control (a replication function or a remote copying function) to store a replica of data of the storage system 600 on a primary site in the other storage system installed on a secondary site for the purpose of prevention of data destruction caused by occurrence of a disaster (disaster recovery), etc.

The disk control portions 140 and the management terminal 160 are connected to one another through the internal LAN 151 so as to be able to communicate with one other. Accordingly, micro-programs etc., to be executed by the disk control portions 140 can be sent and installed from the management terminal 160. The configuration of each disk control portion 140 will be described later.

(Management Terminal)

The management terminal 160 is a computer for maintaining and managing the storage system 600. When the management terminal 160 is operated, for example, setting of physical disk configuration in the storage devices 300, setting of LUs, installation of micro-programs to be executed by the channel control portions 110, etc. can be conducted. As the setting of physical disk configuration in the storage devices 300, for example, increase or decrease in the number of physical disks, change in RAID configuration (e.g., change from RAID1 to RAID5), etc. may be made. Further, operations such as checking the operating state of the storage system 600, specifying a failure portion, installing an operating system to be executed by each channel control portion 110, etc. may be also made by the management terminal 160. The management terminal 160 may be also connected to an external maintenance center through an LAN, a telephone line or the like so that failure in the storage system 600 can be monitored by use of the management terminal 160 and that measures against failure can be taken speedily when failure occurs. Notice of occurrence of failure is given, for example, from an OS, an application program, a driver software, etc. This notice is made by an HTTP (HyperText Transport Protocol), an SNMP (Smile Network Management Protocol), an e-mail, etc. The setting and control may be made by an operator or the like while a Web page provided by a Web server operated by the management terminal 160 is used as a user interface. The operator or the like may perform setting of a subject or content of failure monitoring, setting of a failure notice destination, etc. by operating the management terminal 160.

The management terminal 160 may be built in the storage device controller 100 or may be externally attached to the storage device controller 100. The management terminal 160 may be provided as a computer exclusively used for maintenance and management of the storage device controller 100 and the storage devices 300 or may be implemented as a general-purpose computer formed to have a maintenance and management function.

Figures 2, 3, 4:
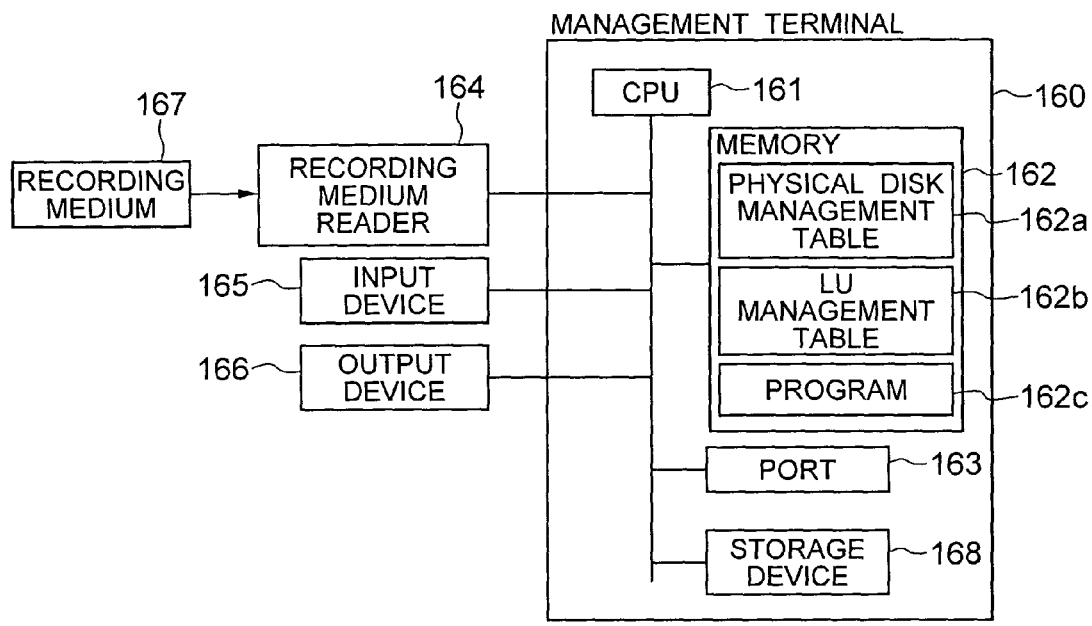
FIG. 2 is a block diagram showing the configuration of a management terminal in this embodiment.
FIG. 3 is a view showing a physical disk management table in this embodiment.
FIG. 4 is a view showing an LU management table in this embodiment.

FIG. 2 is a block diagram showing the configuration of the management terminal 160.

The management terminal 160 includes a CPU 161, a memory 162, a port 163, a recording medium reader 164, an input device 165, an output device 166, and a storage device 168.

The CPU 161 has charge of general control of the management terminal 160. When the CPU 161 executes a program 162c stored in the memory 162, the function of a Web server as described above, or the like, can be provided. The memory 162 stores a physical disk management table 162a and an LU management table 162b as well as the program 162c.

The physical disk management table 162a is a table for managing the physical disks (disk drives) contained in the storage devices 300. FIG. 3 shows the physical disk management table 162a. Of a large number of physical disks contained in the storage devices 300, disk numbers #001 to #006 are shown in FIG. 3. The capacity, RAID configuration and status of use are shown for each physical disk.

The LU management table 162b is a table for managing the LUs logically set on the physical disks. FIG. 4 shows the LU management table 162b. Of a large number of LUs set on the storage devices 300, LU numbers #1 to #3 are shown in FIG. 4. The physical disk number, capacity and RAID configuration are shown for each LU.

The recording medium reader 164 is a device for reading programs and data recorded in a recording medium 167. The programs and data read thus are stored in the memory 162 or the storage device 168. Accordingly, for example, a program 162c recorded in the recording medium 167 can be read from the recording medium 167 by the recording medium reader 164 and stored in the memory 162 or the storage device 168. A flexible disk, a CD-ROM, a semiconductor memory, or the like, may be used as the recording medium 167. The recording medium reader 164 may be built in the management terminal 160 or may be externally attached to the management terminal 160. The storage device 168 is, for example, a hard disk device, a flexible disk device, a semiconductor storage device, etc. The input device 165 is used for inputting data into the management terminal 160 by an operator or the like. For example, a keyboard, a mouse, or the like is used as the input device 165. The output device 166 is a device for outputting information to the outside. For example, a display, a printer, or the like, is used as the output device 166. The port 163 is connected to the internal LAN 151, so that the management terminal 160 can communicate with the channel control portions 110, the disk control portions 140, etc. through the port 163. The port 163 may be also connected to the LAN 400 or to the telephone line.

(External Appearance View)

Figure 5:
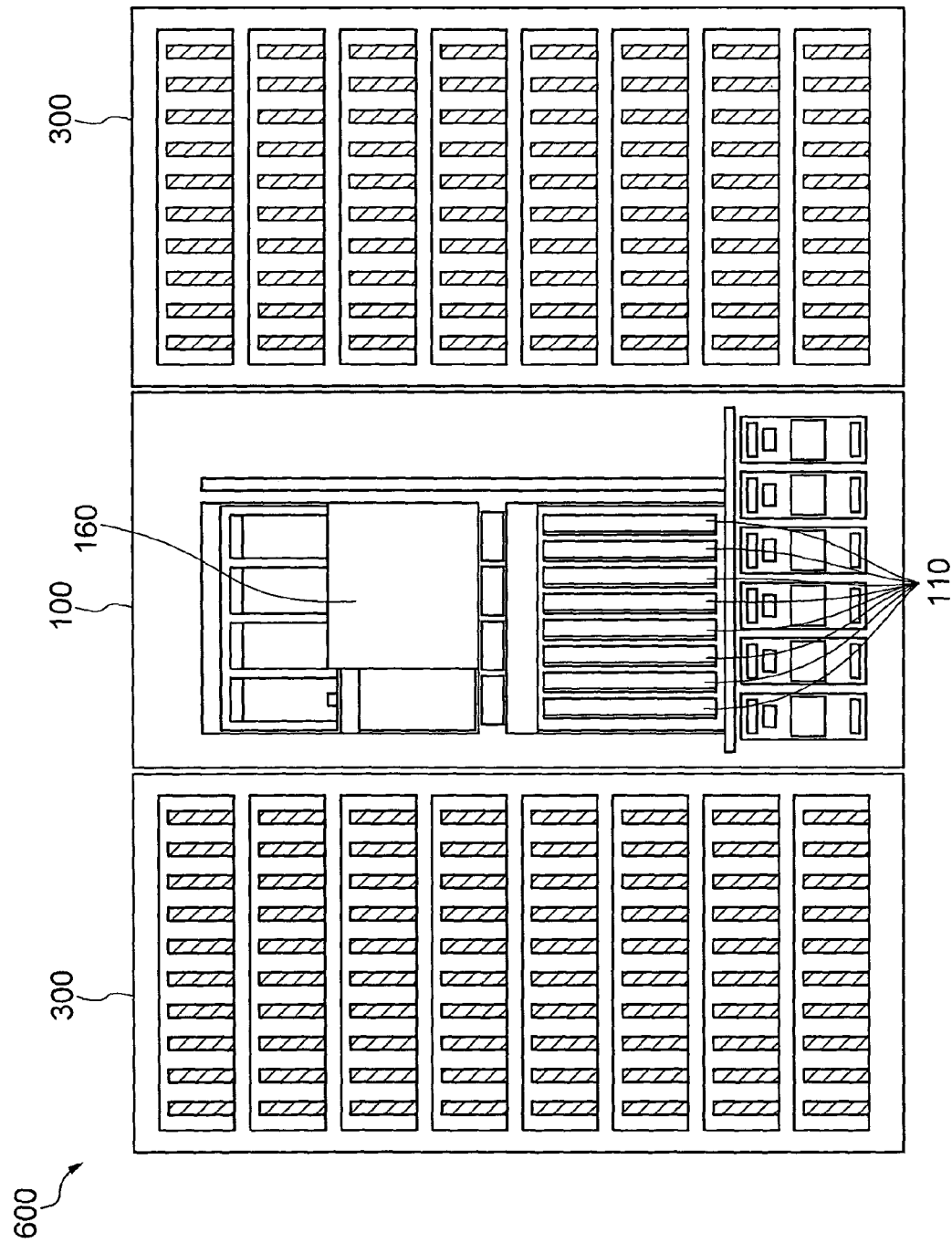
FIG. 5 is a view showing the external appearance configuration of the storage system in this embodiment.
Figure 6:
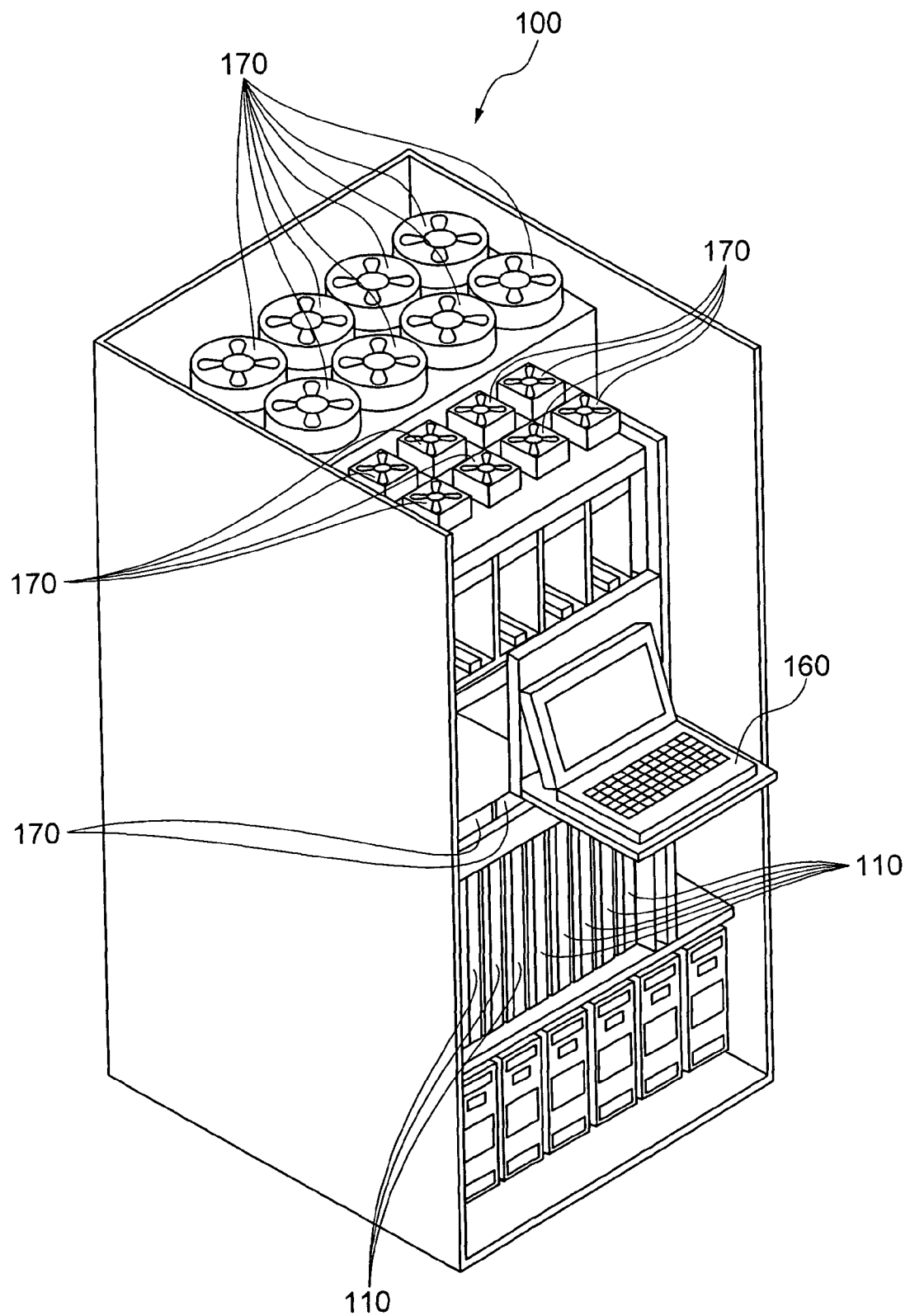
FIG. 6 is a view showing the external appearance configuration of a storage device controller in this embodiment.

FIG. 5 shows the external appearance configuration of the storage system 600 according to this embodiment. FIG. 6 shows the external appearance configuration of the storage device controller 100.

As shown in FIG. 5, the storage system 600 according to this embodiment is formed so that the storage device controller 100 and the storage devices 300 are stored in respective casings. The casings of the storage devices 300 are disposed on opposite sides of the casing of the storage device controller 100.

The storage device controller 100 has the management terminal 160 in its front center portion. The management terminal 160 is closed with a cover. When the cover is opened as shown in FIG. 6, the management terminal 160 can be used. Although the management terminal 160 shown in FIG. 6 is shaped like a so-called notebook type personal computer, any shape may be used.

Slots for attaching boards of the channel control portions 110 are provided below the management terminal 160. The boards of the channel control portions 110 are units in which circuit boards of the channel control portions 110 are formed respectively and which are attached to the slots respectively. In the storage system 600 according to this embodiment, eight slots are prepared. FIGS. 5 and 6 show a state in which the boards of the channel control portions 110 are attached into the eight slots respectively. A guide rail is provided in each slot so that the board of the channel control portion 110 can be attached into the slot through the guide rail. When the boards of the channel control portions 110 are inserted into the slots along the guide rails respectively, the boards of the channel control portions 110 can be mounted on the storage device controller 100. When the board of the channel control portion 110 which has been attached into each slot is drawn out forward along the guide rail, the board of the channel control portion 110 can be removed. A connector is provided in a front portion on a deep side of each slot so that the board of each channel control portion 110 can be electrically connected to the storage device controller 100 by the connector.

Channel control portions 110 of the type having a function for connection to an SAN (Storage Area Network) and channel control portions 110 of the type having a function for performing communications in accordance with a main frame type protocol such as FICON (Fibre Connection) (registered trademark), ESCON (Enterprise System Connection) (registered trademark) or the like, as well as channel control portions 110 of the type functioning as an NAS described above, may be attached into the slots. At least one board for channel control portion 110 can be mounted into the eight slots. Accordingly, for example, boards for CHNs 110 may be mounted into all the eight slots. Further, some slots may be provided as empty slots in a state that the boards of the channel control portions 110 have not been attached into the slots yet.

Figure 11:
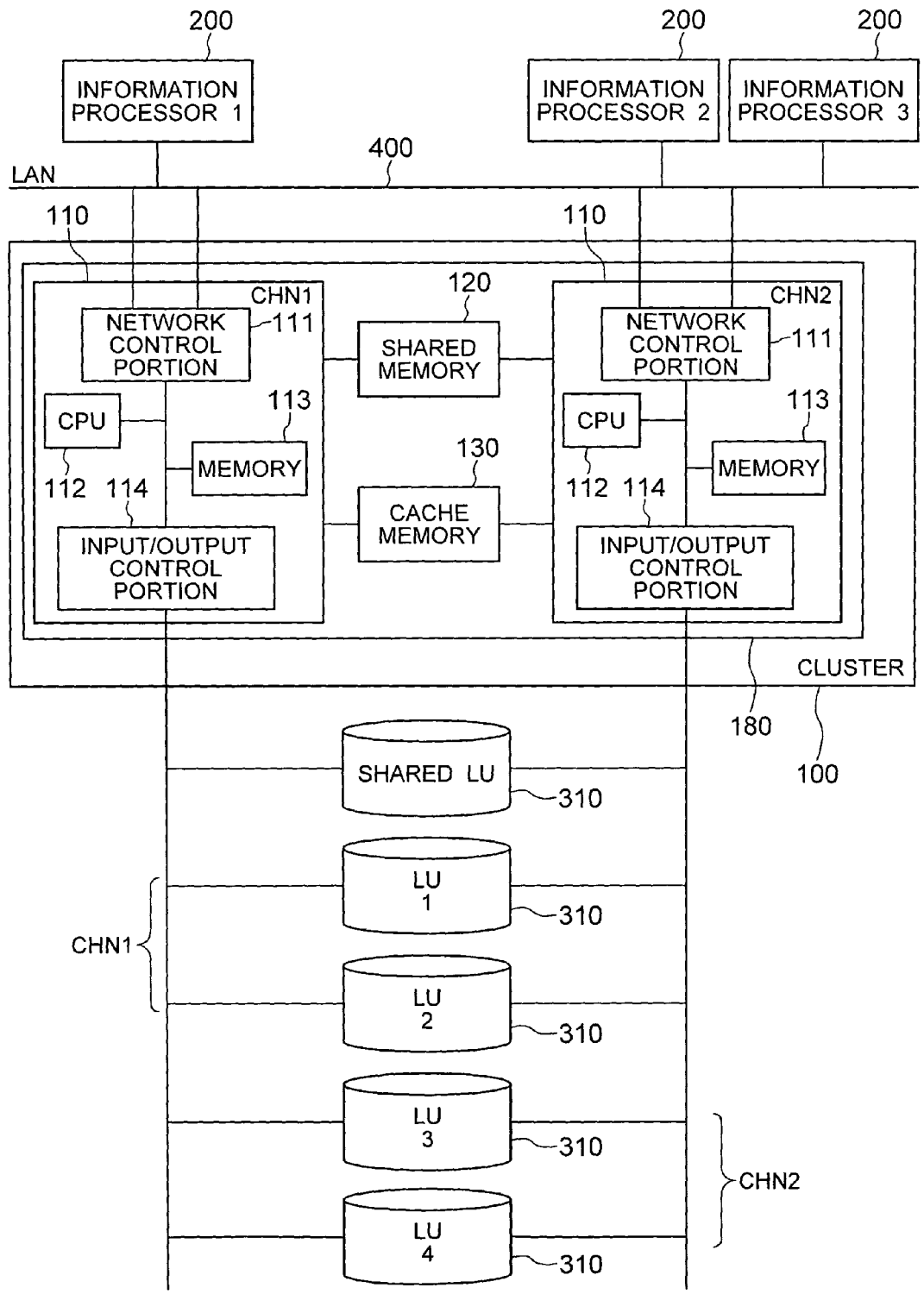
FIG. 11 is a diagram showing a state in which a cluster is constituted by channel control portions in this embodiment.

In the channel control portions 110 attached into the slots, each cluster is constituted by the same kind of channel control portions 110. For example, a pair of CHNs 110 may form a cluster. When clusters are formed, even in the case where failure occurs in a certain channel control portion 110 in a certain cluster, processing that has been executed by the failed channel control portion 110 until then can be handed over to the other channel control portion 110 in the cluster (fail-over control). FIG. 11 is a view showing a state in which a pair of CHNs 110 form a cluster. The cluster will be described later in detail.

Incidentally, in the storage device controller 100, two power supply systems are provided for improvement in reliability. The eight slots into which the boards of the channel control portions 110 are attached are divided into four and four by the two power supply systems. Therefore, when clusters are formed, each of the clusters contains boards of the channel control portions 110 belonging to the two power supply systems respectively. As a result, even in the case where failure occurs in one power supply system so that power supply stops, power supply to the board of the channel control portion 110 belonging to the other power supply system in the same cluster is continued so that processing can be handed over to the channel control portion 110 (fail-over).

Incidentally, as described above, each channel control portion 110 is provided as a board, that is, a unit which can be attached into each slot. One unit may be composed of a plurality of circuit boards integrated into one body.

Though not shown in FIGS. 5 and 6, other devices such as the disk control portions 140, the shared memory 120, etc. for forming the storage device controller 100 are attached to the back, or the like, of the storage device controller 100.

Fans 170 for radiating heat generated in the boards of the channel control portions 110, etc. are provided in the storage device controller 100. The fans 170 are provided on a top portion of the storage device controller 100 and on an upper portion of the slots for the channel control portions 110.

Incidentally, for example, conventional devices commercialized to support the SAN can be used as the storage device controller 100 and the storage devices 300 configured to be packed in casings. Particularly when the shape of the connector provided in the board of each CHN 110 is formed so as to be able to be directly attached into a slot provided in a conventional casing as described above, conventional devices can be used more easily. That is, the storage system 600 according to this embodiment can be constructed easily when existing products are used.

(Channel Control Portion)

In the storage system 600 according to this embodiment, as described above, each CHN 110 accepts a file access request from a certain information processor 200 and provides NAS service to the information processor 200.

Figure 7:
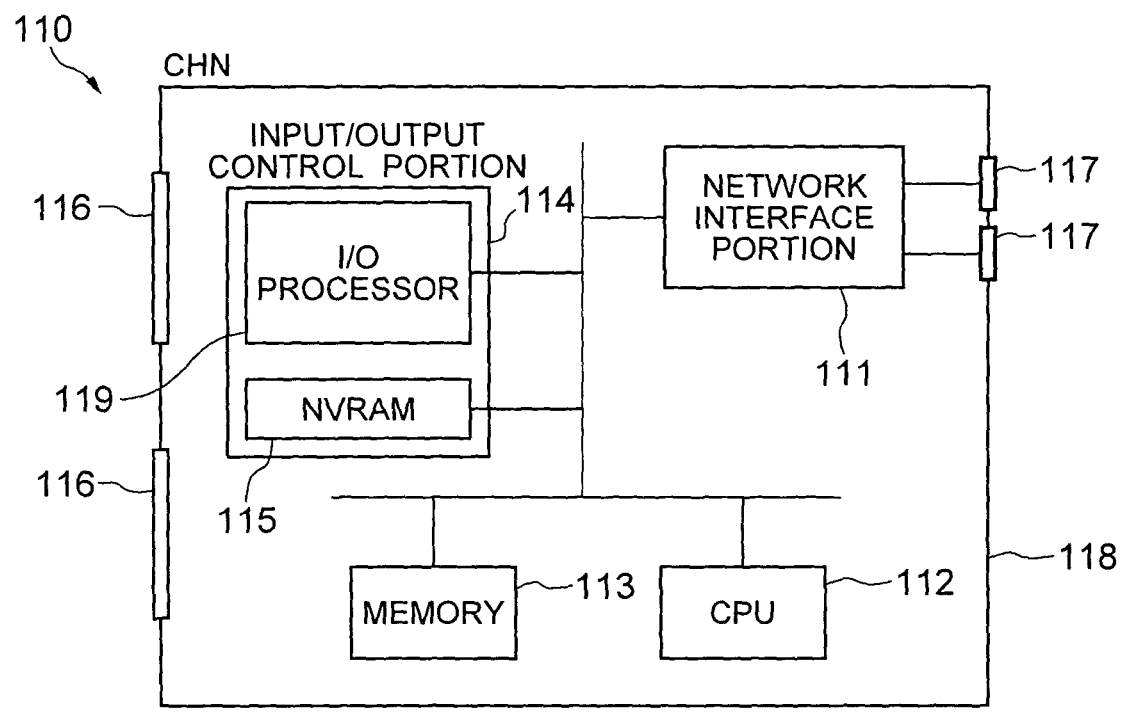
FIG. 7 is a diagram showing a CHN in this embodiment.

FIG. 7 shows the hardware configuration of a CHN 110. As shown in FIG. 7, the hardware of the CHN 110 is constituted by a unit. This unit is hereinafter also referred to as NAS board. The NAS board may be composed of a circuit board or of a plurality of circuit boards. More specifically, the NAS board includes a network interface portion 111, a CPU 112, a memory 113, an input/output control portion 114 (having an I/O (Input/Output) processor 119, and an NVRAM (Non-Volatile RAM) 115), board connection connectors 116, and communication connectors 117. The NAS board is formed and configured as a circuit board on which these parts are integrated into one unit.

The network interface portion 111 has a communication interface for communicating with the information processors 200. Through the network interface portion 111, the CHN 110 receives a file access request sent from a certain information processor 200, for example, according to TCP/IP. The communication connectors 117 are connectors used for communicating with the information processors 200. In the case of the CHN 110, the communication connectors 117 are connectors that can be connected to the LAN 400, for example, to support Ethernet (registered trademark).

The CPU 112 has charge of control for making the CHN 110 function as an NAS board.

Figure 8:
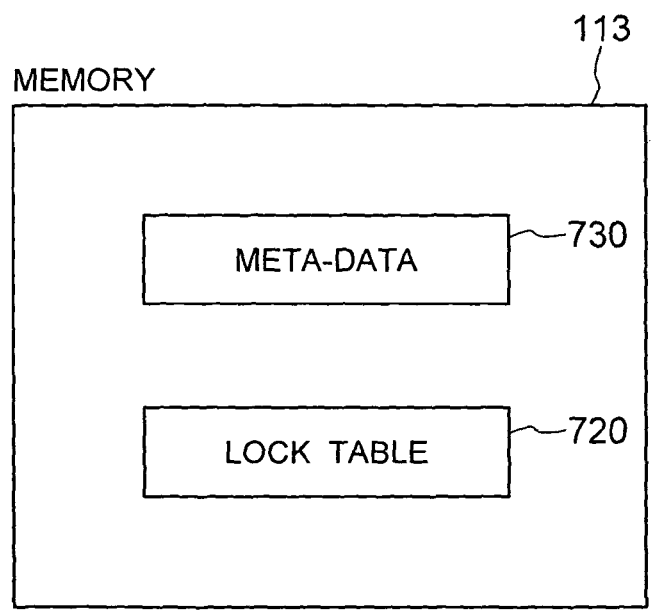
FIG. 8 is a diagram for explaining the content of data stored in a memory in this embodiment.
Figure 10:
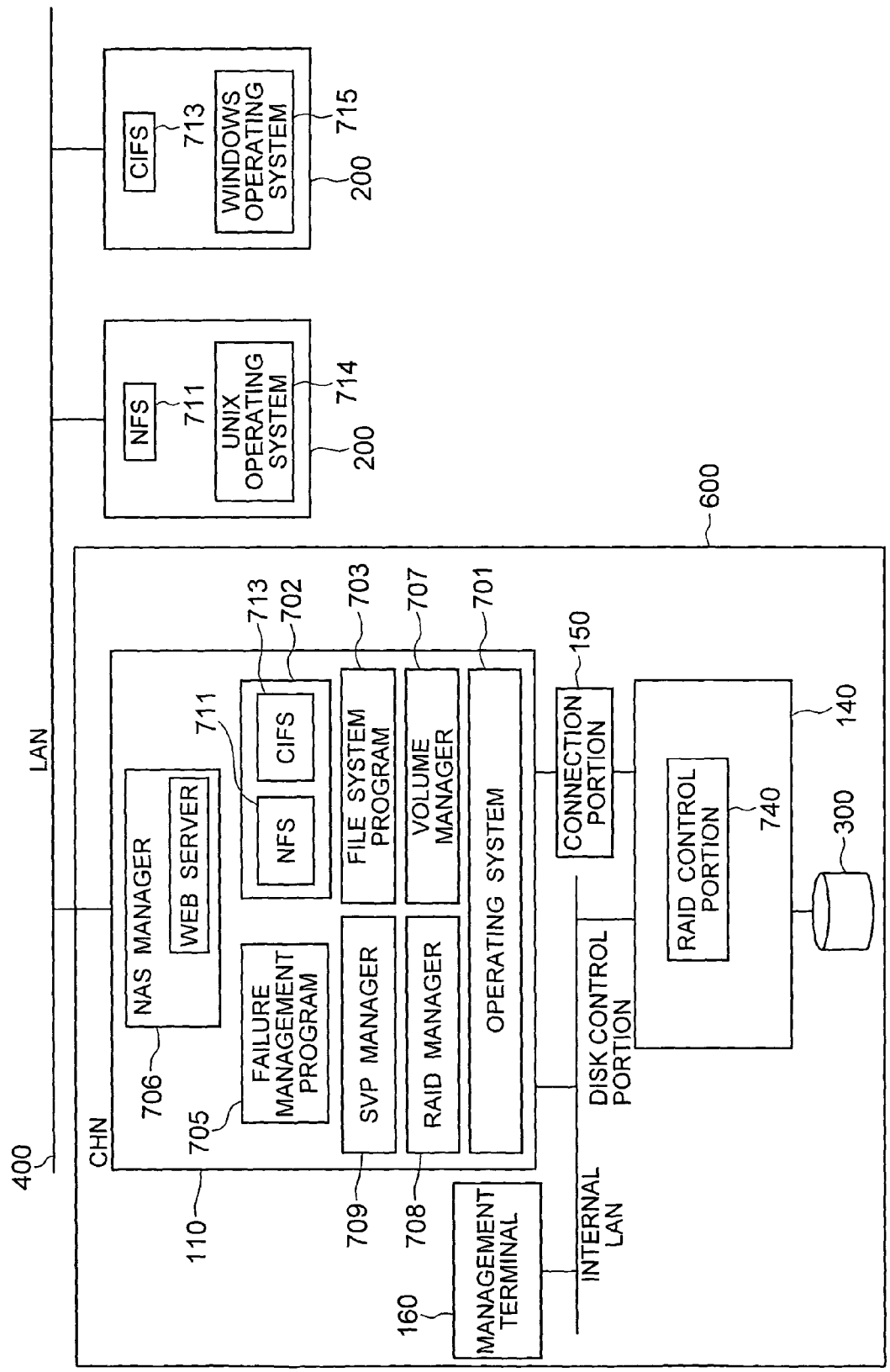
FIG. 10 is a software configuration diagram in this embodiment.

Various programs and data are stored in the memory 113. For example, meta-data 730 and a lock table 720 shown in FIG. 8 or various kinds of programs such as an NAS manager 706 etc. shown in FIG. 10 are stored in the memory 113.

The meta-data 730 is information generated in correspondence with files managed by a file system. The meta-data 730 contains information for specifying file storage places, such as addresses on LUs in which data of files are stored, data sizes, etc. The meta-data 730 may further contain information concerning file capacity, owner, update time, etc. The meta-data 730 may be generated in correspondence with directories instead of files. The meta-data 730 is also stored in each of LUs on the storage devices 300.

The lock table 720 is a table for exclusively controlling file access executed by the information processors 200. Exclusive control permits files to be used in common with the information processors 200. The lock table 720 is divided into a file lock table and an LU lock table. The file lock table is a table for indicating whether each file is locked or not. While a certain file is opened by one of the information processors 200, the file is locked. The locked file is disabled from being accessed by the other information processors 200. The LU lock table is a table for indicating whether each LU is locked or not. While a certain LU is accessed by one of the information processors 200, the LU is locked. The locked LU is disabled from being accessed by the other information processors 200.

The input/output control portion 114 exchanges data and commands with the disk control portions 140, the cache memory 130, the shared memory 120 and the management terminal 160. The input/output control portion 114 has an I/O processor 119, and an NVRAM 115. For example, the I/O processor 119 is constituted by a one-chip micro-computer. The I/O processor 119 controls the exchange of data and commands and relays communications between the CPU 112 and the disk control portions 140. The NVRAM 115 is a non-volatile memory that stores programs taking charge of control of the I/O processor 119. The contents of the programs stored in the NVRAM 115 can be written or rewritten in accordance with instructions given from the management terminal 160 or the NAS manager 706 that will be described later.

Figure 9:
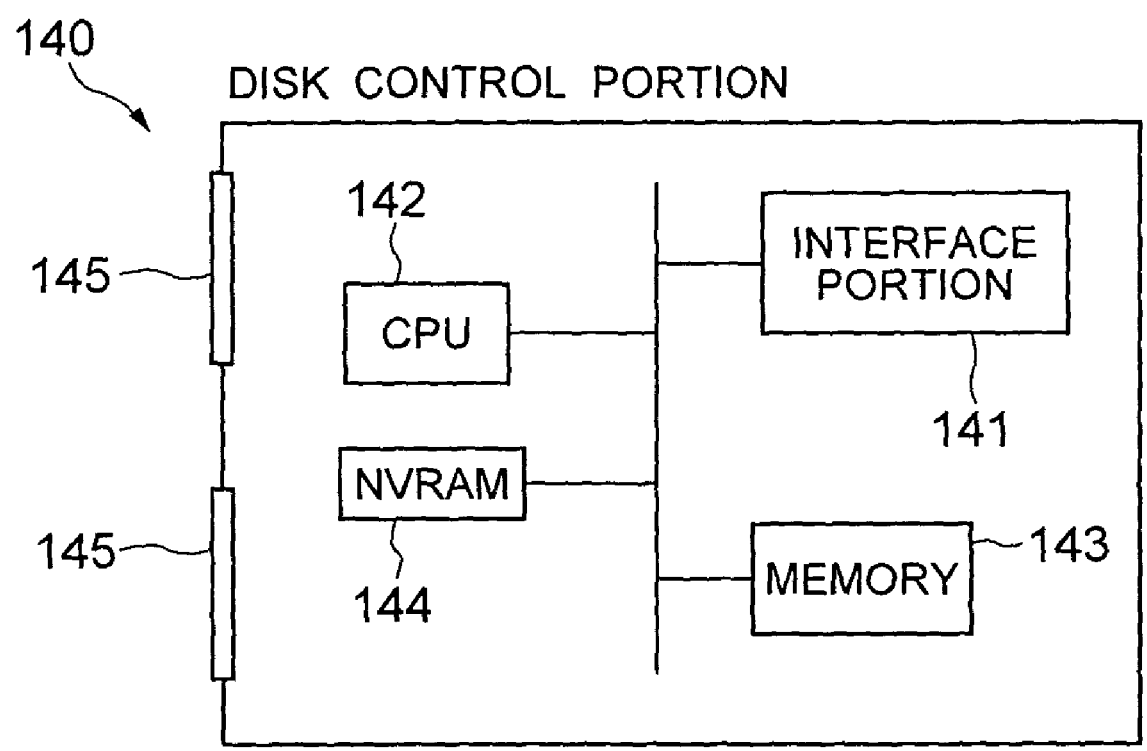
FIG. 9 is a diagram showing a disk control portion in this embodiment.

FIG. 9 is a diagram showing the hardware configuration of each disk control portion 140.

Each disk control portion 140 is formed as a board integrated as a unit. The board of the disk control portion 140 includes an interface portion 141, a memory 143, a CPU 142, an NVRAM 144, and board connection connectors 145. The board is formed as a circuit board on which these parts are integrated into one unit.

The interface portion 141 has a communication interface for communicating with the channel control portions 110, etc. through the connection portion 150, and a communication interface for communicating with the storage devices 300.

The CPU 142 has charge of general control of the disk control portion 140 and communicates with the channel control portions 110, the storage devices 300 and the management terminal 160. When various kinds of programs stored in the memory 143 or the NVRAM 144 are executed, the function of the disk control portion 140 according to this embodiment can be implemented. Examples of the function implemented by the disk control portion 140 are control of the storage devices 300, RAID control, duplication management and backup control of data stored in the storage devices 300, remote copy control, and so on.

The NVRAM 144 is a non-volatile memory for storing programs taking charge of control of the CPU 142. The contents of the programs stored in the NVRAM 144 can be written or rewritten in accordance with instructions given from the management terminal 160 or the NAS manager 706.

The board of the disk control portion 140 has board connection connectors 145. When a board connection connector 145 is fitted to a storage device controller 100 side connector, the board of the disk control portion 140 is electrically connected to the storage device controller 100.

(Software Configuration)

FIG. 10 is a diagram showing the software configuration of the storage system 600 according to this embodiment.

For example, the operating system 701 is UNIX (registered trademark). On the operating system 701, softwares (programs) such as an RAID manager 708, a volume manager 707, an SVP manager 709, a file system program 703, a network control portion 702, a failure management program 705, an NAS manager 706, etc. operate.

The RAID manager 708 operating on the operating system 701 provides a function for setting parameters for a RAID control portion 740 and controlling the RAID control portion 740. The RAID manager 708 accepts parameters and control instruction information from the operating system 701, another application operating on the operating system 701 or the management terminal 160, and performs setting of the accepted parameters for the RAID control portion 740 and transmission of control commands corresponding to the control instruction information to the RAID control portion 740.

Examples of the parameters set here are parameters for definitions (such as designation of configuration information of an RAID group, stripe size, etc.) of storage devices (physical disks) constituting an RAID group, parameters for setting an RAID level (such as RAID0, RAID1 or RAID5), and so on. Examples of the control commands sent from the RAID manager 708 to the RAID control portion 740 are commands for instructing configuration of RAID, deletion and capacity change, commands for requesting configuration information of each RAID group, and so on.

The volume manager 707 further virtualizes LUs provided by the RAID control portion 740 and provides the virtualized LUs as virtual logical volumes to the file system program 703. One virtual logical volume includes one or more logical volumes.

The main function of the file system program 703 is to manage association of filenames designated by file access requests received by the network control portion 702, with addresses on virtual logical volumes storing the filenames. For example, the file system program 703 designates addresses, on virtual logical volumes, corresponding to filenames designated by file access requests respectively.

The network control portion 702 includes two file system protocols of NFS (Network File System) 711 and CIFS (Common Interface File System) 713. The NFS 711 accepts file access requests from UNIX (registered trademark) information processors 200 in which the NFS 711 operates. On the other hand, the CIFS 713 accepts file access requests from Windows (registered trademark) information processors 200 in which the CIFS 713 operates.

The NAS manager 706 is a program for performing checking the operating state of the storage system 600, setting the storage system 600, controlling the storage system 600, and so on. The NAS manager 706 further has the function of a Web server and provides a setting Web page to a pertinent information processor 200 so that the storage system 600 can be set and controlled on the information processor 200 side. The setting Web page is provided by the NAS manager 706 that operates in each of the channel control portions 110. In response to an HTTP (HyerText Transport Protocol) request from a certain information processor 200, the NAS manager 706 sends data for the setting Web page to the information processor 200. A system administrator or the like instructs setting and controlling of the storage system 600 by using the setting Web page displayed on the information processor 200.

Upon reception of data concerning setting and controlling sent from the information processor 200 in accordance with the operation on the setting Web page, the NAS manager 706 executes the setting and controlling corresponding to the data. In this manner, various setting and controlling of the storage system 600 can be performed on the information processor 200 side. The NAS manager 706 notifies the OS and the application program operating on the channel control portion 110, the disk control portion 140, etc. of the contents set on the setting Web page. The contents set on the setting Web page may be managed in a shared LU 310.

Examples of the contents set on the setting Web page provided by the NAS manager 706 are management and setting of LUs (management of capacity, extension or reduction of capacity, user allocation, etc.), setting and controlling concerning the aforementioned function such as duplication management and remote copy (replication) (setting of duplication source LU and duplication destination LU, etc.), cluster management between redundantly configured CHNs (setting of correspondence relation to CHNs to be failed over, fail-over method, etc.), version management of the OS and application programs operating on the OS, and management and setting of the operating state of a virus detection program or a security management program for providing a function concerning data security such as virus removal.

Incidentally, for checking of the operating state of the storage system 600 and setting and controlling of the storage system 600 by the NAS manager 706, a client server system may be used instead of the method using the aforementioned setting Web page. In this case, the NAS manager 706 has a server function of a client server system. Setting and controlling sent in accordance with the operation of a client function of the information processor 200 are carried out in the same manner as in the aforementioned setting Web page to thereby perform checking of the operating state of the storage system 600 and setting and controlling of the storage system 600.

The failure management program 705 is a program for performing fail-over control between channel control portions 110 as constituent members of a cluster.

FIG. 11 shows a state in which two CHNs 110 form a cluster 180. In FIG. 11, there is shown the case where CHN1 (channel control portion 1) 110 and CHN2 (channel control portion 2) 110 form a cluster 180.

As described above, a fail-over process is carried out between the channel control portions 110 that form the cluster 180. That is, when, for example, some failure occurs in CHN1 (110) so that processing cannot be continued, the processing that has been executed by CHN1 (110) until then is handed over to CHN2 (110). The fail-over process is carried out by the failure management program 705 executed by CHN1 (110) and CHN2 (110).

Each of CHN1 (110) and CHN2 (110) executes the failure management program 705 and writes notice of normal processing executed by itself in the shared memory 120. Each confirms the notice received from the other. When each cannot detect the notice written by the other, a fail-over process is carried out on the basis of the decision that some failure occurs in the other. Processing is handed over to the other CHN through the shared LU 310 when the fail-over process is carried out.

Fail-over may be carried out automatically in this manner, or may be carried out manually by the operator's operating the management terminal 160. Or fail-over may be carried out manually on the information processor 200 side by the user's using the setting Web page provided by the NAS manager 706. For example, fail-over is carried out manually in the case where the hardware (e.g., NAS board) of a channel control portion 110 needs to be exchanged because of expiration of the durable period, upgrade of the version, periodic diagnosis, etc.

The SVP manager 709 provides various kinds of service to the management terminal 160 in accordance with requests from the management terminal 160. For example, the SVP manager 709 provides various kinds of set contents concerning the storage system 600, such as set contents of LUs 310, set contents of RAID, etc., to the management terminal 160 and reflects various kinds of setting concerning the storage system 600 given from the management terminal 160.

(Assignment of LUs to Channel Control Portions)

For example, the setting Web page can be used for assigning the LUs 310 to the channel control portions 110. More specifically, LUNs (Logical Unit Numbers) which are identifiers of the LUs 310 can be set in a setting field provided on the setting Web page so as to be associated with the channel control portions 110 to thereby designate the assignment of the LUs 310 to the channel control portions 110. Here, the LUN of an LU 310 may be assigned to a plurality of channel control portions 110 so that the LU 310 can be used in common with the plurality of channel control portions 110.

These set contents are stored in the memories 113, the shared memory 120, the shared LU 310, etc. The thus stored information concerning the assignment of the LUs 310 to the channel control portions 110 can be referred to by the OS or application program appropriately and used for limiting access from the channel control portions 110 to the respective LUs 310. When, for example, a certain channel control portion 110 receives a data input/output request from a certain information processor 200, the channel control portion 110 refers to the set contents and checks whether the target of the data input/output request is the LU 310 assigned to the channel control portion 110 itself or not. Then, the channel control portion 110 performs control so that processing concerning the data input/output request is carried out when the target is the LU 310 assigned to the channel control portion 110 itself, but the processing is not carried out when the target is not the LU 310 assigned to the channel control portion 110 itself. Incidentally, the setting and controlling may be conducted on the management terminal 160 side.

(Access Limitation on Each CHN)

Access limitation may be set for each channel control portion 110 so that only a specific information processor 200 can access the channel control portion 110. Or access limitation may be set for each channel control portion 110 so that a specific group of information processors 200 can access the channel control portion 110. The setting of the access limitation can be also conducted on the information processor 200 side using the setting Web page.

These set contents are stored in the memories 113, the shared memory 120, the shared LU 310, etc. The thus stored information concerning the assignment of the LUs 310 to the channel control portions 110 can be referred to by an OS or application program appropriately. When, for example, a certain channel control portion 110 is to be accessed by a certain information processor 200 disabled from accessing the channel control portion 110, the information is used for limiting the access.

Because access limitation is carried out for each channel control portion 110 in this manner, the information processors 200 using the respective channel control portions 110 can be assigned so that processing load imposed on the information processors 200 can be distributed equally, for example, from the user's viewpoint. The use of this function permits the storage system 600 to be operated efficiently. Incidentally, the setting and controlling may be conducted on the management terminal 160 side.

(Installation Process)

Installation of programs required for making the storage system 600 according to this embodiment serve as an NAS will be described below.

To make the storage system 600 serve as an NAS, an OS 701 to be executed by each CHN 110 needs to be installed. Micro-programs (firmware) to be executed by the CHNs 110 and disk control portions 140 also need to be installed. In addition, application programs such as the volume manager 707, the file system program 703, the NAS manager 706, etc. need to be installed in each CHN 110 as occasion demands.

A program such as the OS 701 or an application program is stored in a system LU (system disk) set in each storage device 300. When this program is stored in the system LU, information such as the name (identifier) of the program, the type of the program for discrimination between OS and application program, the version of the program, etc. is recorded in a program status table, a license number information table, a license status information table, etc. which will be described later. Incidentally, these tables are stored in the shared LU (shared disk) 310.

An OS installation region, a failure detection storage region, a cluster information storage region, etc. may be allocated to the system LU. Information concerning failure management such as dump lists output from the OS 701 or application program (a core dump, a memory dump and a disk dump output due to abnormal termination of the kernel of the OS 701, abnormal terminal of a demon, failure caused by endlessly looping processing between a plurality of processes, and so on) is stored in the failure detection storage region. Information required for forming a cluster 180 from CHNs 110 is stored in the cluster information storage region. Because storage regions for storing the OS 701 and application programs are provided in each storage device 300 in this manner, such storage regions need not be provided in each CHN 110.

The failure detection storage region and the cluster information storage region may be provided as a failure management LU and a cluster LU respectively separately from the system LU. Incidentally, when the storage devices 300 are operated by an RAID5 method, it is preferable that the system LU, the failure management LU, the cluster LU or the like is not concentrated into one parity group but distributed into a plurality of parity groups. This is because significant data on operating the storage device controller 100 are stored in these LUs 310.

Installation of the OS 701 and application programs is conducted on the management terminal (computer) 160 side. Specifically, the recording medium reader 164 included in the management terminal 160 may be used so that these programs can be read from the recording medium 167 such as a CD-ROM, or the port 163 may be used so that these programs can be downloaded through the port 163, for example, from the Internet and read. These programs are installed in the system LU provided in the storage devices 300 in accordance with each CNN 110.

(Setting of Cluster)

As described above, the failure management program 705 in the storage system 600 according to this embodiment performs fail-over control and fail-back control between channel control portions 110 as constituent members of each cluster 180.

The setting of each cluster 180 is carried out so that channel control portions (circuit boards) 110 of the same type attached to the storage device controller 100 are formed into a group (cluster). By this setting, when failure occurs in any one of the channel control portions 110 in the same group (cluster 180), fail-over control is made so that processing that has been heretofore executed by the failed channel control portion 110 can be handed over to the other channel control portion 110 in the cluster 180. In addition, when the failed channel control portion 110 is restored so as to be able to execute processing normally after the fail-over, a fail-back process is carried out so that the processing that has been executed by the other channel control portion 110 can be handed over to the original channel control portion 110 again.

The setting of each cluster 180 may be conducted on the setting Web page. The setting information may be stored in the cluster information storage region of the system disk (system LU), the shared disk (shared LU) 310 allowed to be commonly used by the channel control portions 110 forming each cluster 180, the shared disk (shared LU) 310 allowed to be commonly accessed by all the channel control portions 110 in the storage system 600, etc. Inherited information required for the fail-over process is also stored in the shared LU 310. Incidentally, information such as a program status table, a license number information table and a license status information table which will be described later, as well as the inherited information required for the fail-over process, is stored in the shared LU 310.

Figure 12:
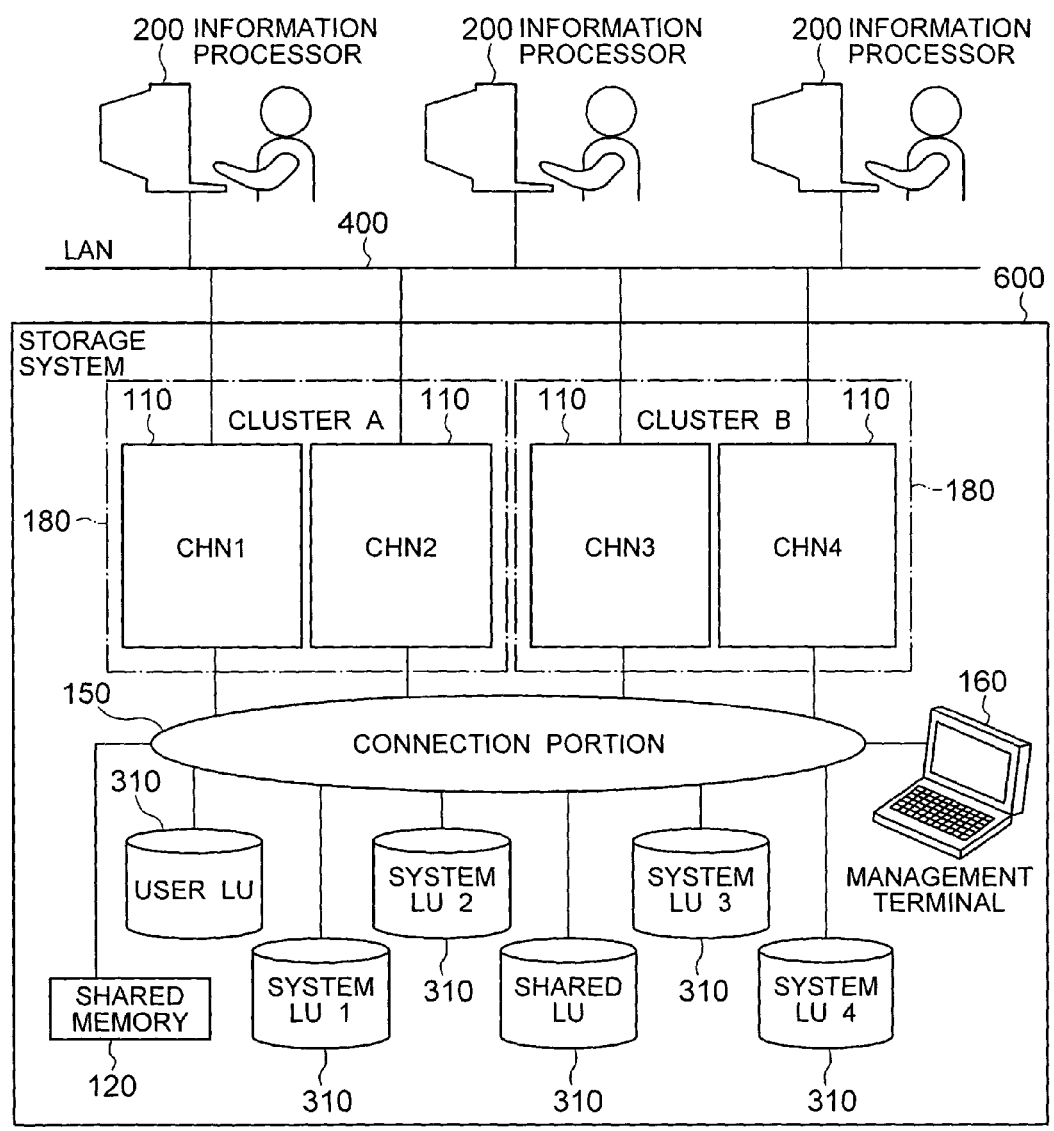
FIG. 12 is a diagram showing the configuration of the storage system in this embodiment.

FIG. 12 is a diagram showing the configuration of the storage device 600 explained as an example of this embodiment. As shown in FIG. 12, the storage system 600 may be configured so that a channel control portion 1 (110) and a channel control portion 2 (110) form a cluster A 180 while a channel control portion 3 (110) and a channel control portion 4 (110) form a cluster B 180. In this case, system disks (storage regions) 1 to 4 (310) are assigned so as to be allowed to be accessed by the channel control portions 1 to 4 (110) respectively. Accordingly, an OS executed by the channel control portion 1 (110), programs installed with the OS, programs and data required for providing NAS service, etc. are stored in the system disk 1. The shared disk (shared LU) 310 allowed to be accessed commonly by the channel control portions 1 to 4 (110) in the storage system 600 is provided in the storage system 600.

(Program License Management)

As described above, each of the channel control portions 1 to 4 (110) carries out a process for uniformizing program states of the channel control portions 1 to 4 (110). In some cases, licenses must be set according to the program. Therefore, each of the channel control portions 1 to 4 (110) also carries out a process for uniformizing the license setting states of the program. Although the embodiment has shown the case where these processes are carried out by each of the channel control portions 1 to 4 (110), these processes may be carried out by the management terminal 160.

An example of the program that must be licensed in the aforementioned manner is an application program. Such an application program can be installed in each of the system LUs 310 assigned to the channel control portions 1 to 4 (110) but cannot be used unless the license of the program is validated. For validating the license, a license key must be first registered. The license key is a password issued by the provider of the application program when the user purchases the application program. For example, the license key is a key containing license contents such as information of allowed application program, allowed storage system 600 (manufacture number of the storage system 600, etc.), allowed license number, allowed license capacity, number of allowed licensees, allowed license period, etc. The license key is encrypted so as to be undecipherable to the user.

Figure 13:
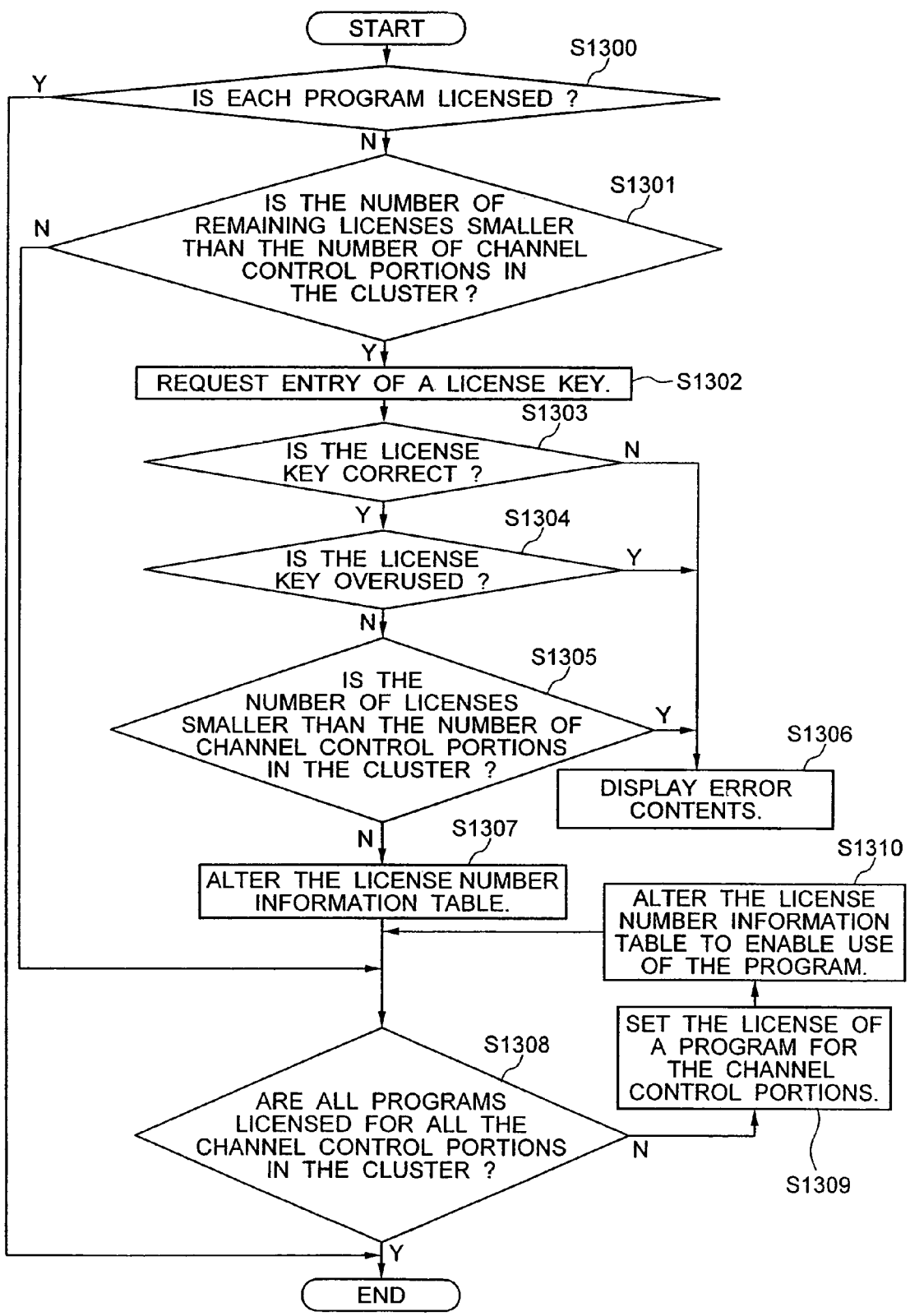
FIG. 13 is a flow chart for explaining a process for uniformizing program license setting states in this embodiment.
Figure 14:
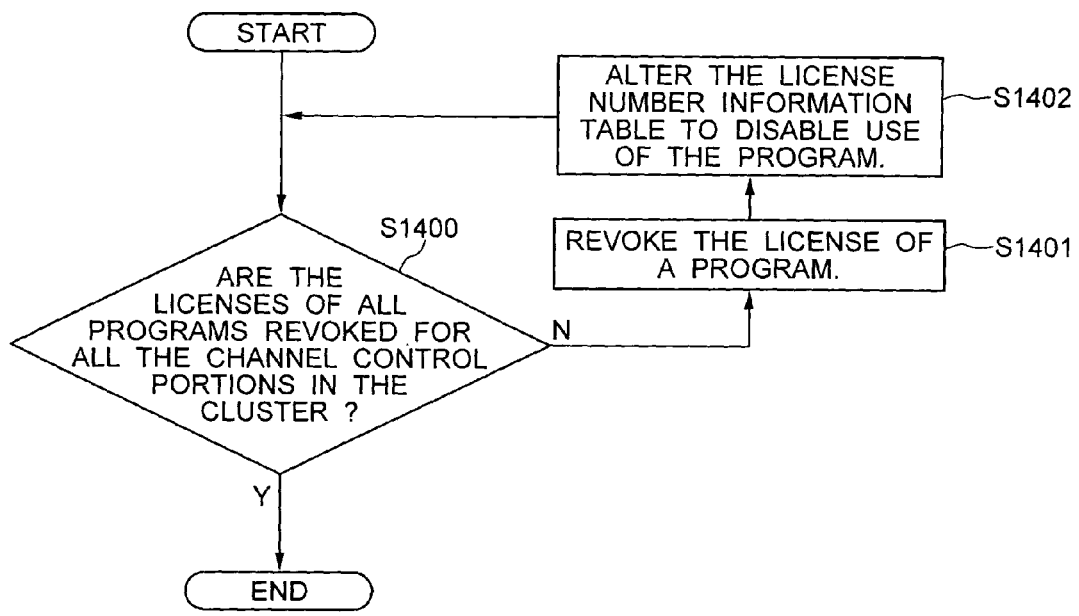
FIG. 14 is a flow chart for explaining a process for uniformizing program license setting states in this embodiment.

FIGS. 13 and 14 show examples of the process for uniformizing the program license setting states of the channel control portions 1 to 4 (110) when clusters 180 are set as shown in FIG. 12.

<Process for Enabling Use of Each Program>

FIG. 13 shows an example of the process for setting licenses of a program for all channel control portions 110 forming a cluster 180 to thereby enable the program to be used by all the channel control portions 110.

The user calls a setting screen of a channel control portion 110 for registering the license key of a program. Then, the channel control portion 110 checks the "Status of Use" field on the license status information table stored in the shared LU 310 and judges whether each of programs installed in the system LUs 1 and 2 (310) assigned to all channel control portions 1 and 2 (110) forming a cluster 180 is licensed (enabled to be used) or not (S1300). FIG. 15 shows an example of the license status information table explained as this embodiment. As shown in FIG. 15, information such as storage system 600 identifier, cluster identifier, channel control portion 110 identifier, program identifier, program type, program version, status of use of the program, etc. is recorded on the license status information table. The license status information table is stored in the system LU 310 or shared LU 310 that can be accessed by channel control portions 110 belonging to the storage system 600 or cluster 180.

When a decision is made in the step S1300 that each of the installed programs is licensed (S1300: Y), this process is terminated. On the other hand, when a decision is made in the step S1300 that each of the installed programs is not licensed (S1300: N), the process goes to step S1301.

In the step S1301, the channel control portion 110 checks the license number information table stored in the shared LU 310 and judges whether the number of licenses remaining in the storage system 600 is smaller than the number of channel control portions 110 belonging to the cluster 180 or not. FIG. 16 shows an example of the license number information table explained as this embodiment. As shown in FIG. 16, information such as storage system 600 identifier (system identifier), program identifier, program version, number of licenses of the program in the storage system 600, number of remaining licenses, etc. is recorded on the license number information table. Incidentally, the license number information table may be stored in the system LU 310 that can be accessed by channel control portions 310 belonging to the storage system 600 or cluster 180. The term "remaining license" means the case where the license key has been already registered but the registered license is not used (set). That is, licenses once registered are managed by the storage system 600. Accordingly, it is unnecessary to re-register the license key, so that the labor required for entry of the license key can be omitted.

Although the above description has been made on the case where the license number information table and the license status information table are provided separately as two tables, the invention may be also applied to the case where the two tables are collected into a table or further divided into a plurality of tables. The information concerning these tables may be displayed when a request to check the tables is issued from a certain information processor 200. FIG. 17 shows an example of license information displayed on a display screen of each information processor 200. As shown in FIG. 17, information such as program name, number of remaining licenses, program type and status of use of the program is displayed on the display screen of the information processor 200. Other information may be further displayed.

When a decision is made in the step S1301 that the number of licenses remaining in the storage system 600 is not smaller than the number of channel control portions 110 belonging to the cluster 180 (S1301: N), the process jumps to step S1308. On the other hand, when a decision is made in the step S1301 that the number of licenses remaining in the storage system 600 is smaller than the number of channel control portions 110 belonging to the cluster 180 (S1301: Y), the process goes to step S1302.

Figure 18:
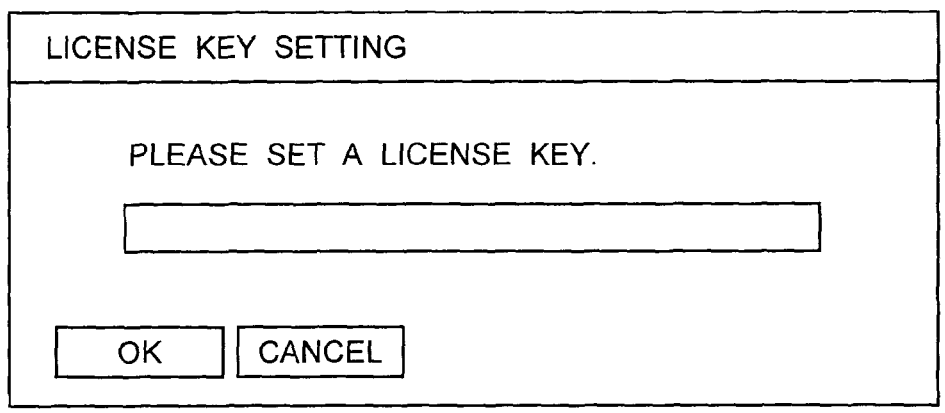
FIG. 18 is a view showing an image of a license key entry screen displayed on a display screen of an information processor.

In the step S1302, entry of a license key is requested while a license key entry screen is displayed on a display screen of the management terminal 160 or information processor 200 as shown in FIG. 18 in order to enable the program to be used by all the channel control portions 110 belonging to the cluster 180. When the license key is entered according to the license key entry request (S1302) by the user, the channel control portion 110 judges whether the entered license key is correct or not (S1303). That is, the channel control portion 110 judges whether the entered license key is identical to the license key issued from the manufacturer.

Figure 19:
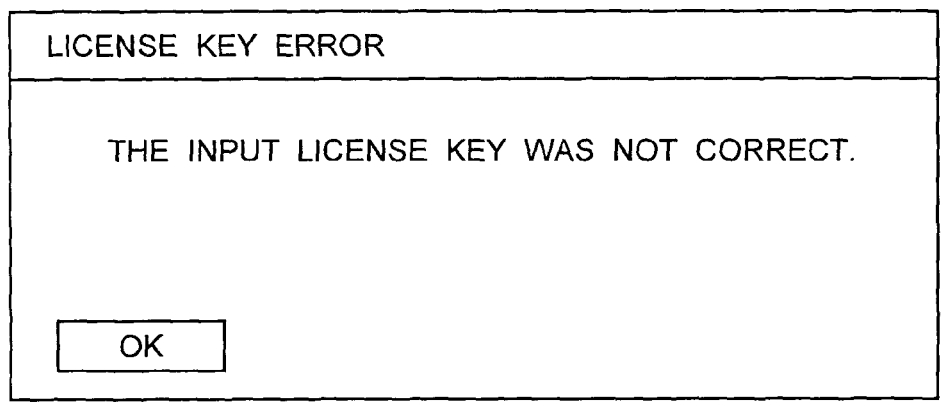
FIG. 19 is a view showing an image of notice of license key error contents sent to a display screen of an information processor and displayed.

When a decision is made in the step S1303 that the license key is not correct (S1303: N), the process jumps to step S1306 in which notice of error contents is sent to the user's information processor 200 and displayed. FIG. 19 shows an example of the notice of license key error contents displayed on the information processor 200. As a result, the user can know that the entered license key is incorrect. On the other hand, when a decision is made in the step S1303 that the input license key is correct (S1303: Y), the process goes to step S1304 in which a judgment is made as to whether the license key is overused or not. That is, a judgment is made as to whether the license key is equal to the license key already registered for the program in other channel control portions of the storage system 600 or not (S1304). As a result, illegal use of the license key can be prevented.

Figure 20:
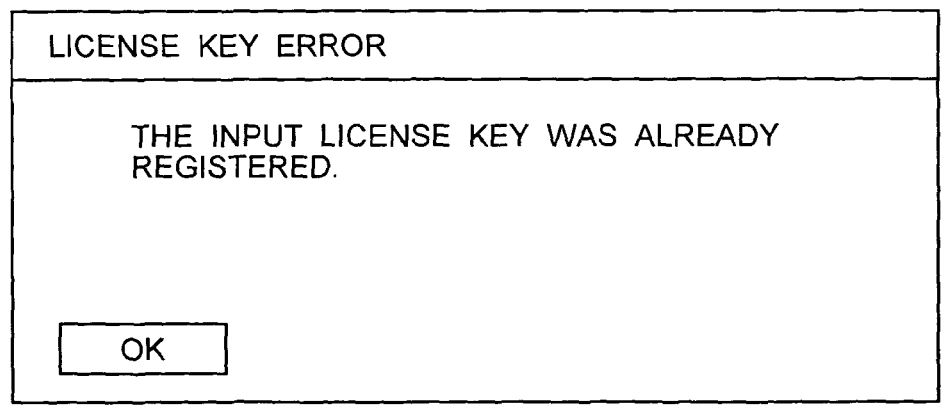
FIG. 20 is a view showing an image of notice of license key error contents sent to a display screen of an information processor and displayed.

When a decision is made in the step S1304 that the license key is overused (S1304: Y), the process jumps to step S1306 in which notice of error contents is sent to the user's information processor 200 and displayed. FIG. 20 shows an example of the notice of license key error contents displayed on the information processor 200. As a result, the user can know that the entered license key has been already registered. On the other hand, when a decision is made in the step S1304 that the license key is not overused (S1304: N), the process goes to step S1305 in which a judgment is made as to whether the sum of the number of licenses incorporated in the entered license key and the number of remaining licenses is smaller than the number of channel control portions 110 belonging to the cluster 180 or not.

Figure 21:
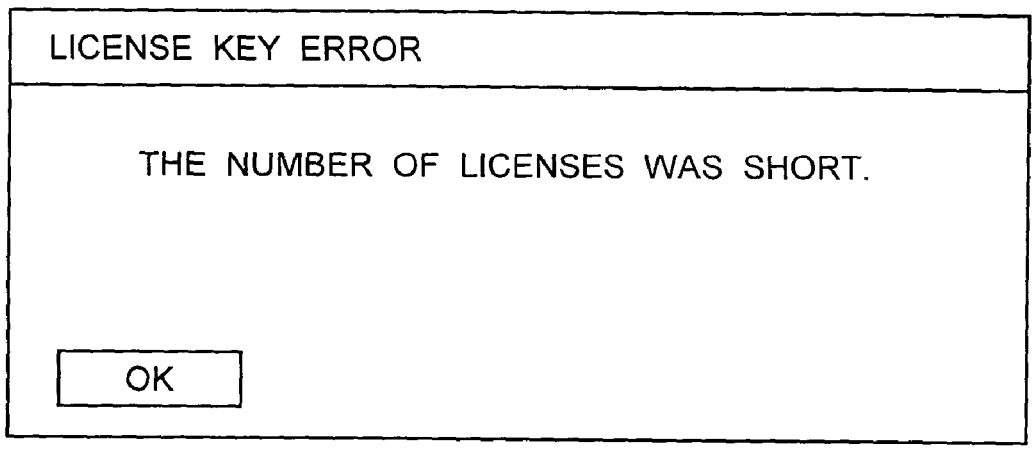
FIG. 21 is a view showing an image of notice of license key error contents sent to a display screen of an information processor and displayed.

When a decision is made in the step S1305 that the sum of the number of licenses incorporated in the entered license key and the number of remaining licenses is smaller than the number of channel control portions 110 belonging to the cluster 180 (S1305: Y), the process goes to step S1306 in which notice of error contents is sent to the user's information processor 200 and displayed. FIG. 21 shows an example of the notice of license key error displayed on the information processor 200. As a result, the user can know that a license key needs to be further registered. In this case, though not shown in FIG. 13, entry of a license key may be requested to the user again after notice of error contents is displayed (S1302).

On the other hand, when a decision is made in the step S1305 that the sum of the number of licenses incorporated in the entered license key and the number of remaining licenses is not smaller than the number of channel control portions 110 belonging to the cluster 180 (S1305: N), the process goes to step S1307 in which respective data on the license number information table are altered. Then, a judgment is made as to whether all programs to be executed by all channel control portions 110 belonging to the cluster 180 are licensed or not (S1308).

When a decision is made in the step S1308 that all programs to be executed by all channel control portions 110 belonging to the cluster 180 are not licensed (S1308: N), each channel control portion 110 sets the license of a program that has been not set yet (S1309). Then, the number of remaining licenses on the license number information table stored in the shared LU 310 is decreased by one, and the status of use on the license status information table shown in FIG. 15 is altered to "Enable" (S1310). Specifically, when "Program 3" is not licensed for the channel control portions 1 and 2 belonging to the cluster A 180, each of the channel control portions 1 and 2 sets the license of "Program 3". Then, the number of remaining licenses on the license number information table is decreased by one, and the status of use corresponding to each of the channel control portions 1 and 2 on the license status information table is altered to "Enable".

When a decision is made in the step S1308 that all programs to be executed by all channel control portions 110 belonging to the cluster 180 are licensed (S1308: Y), the license setting process is terminated.

<Process for Disabling Use of Each Program>

FIG. 14 shows an example of the process for revoking the license of each program for all channel control portions 110 belonging to the cluster 180 and disabling the program from being used by all the channel control portions 110.

This process is carried out when an instruction to disable use of a certain program is given from the user or when the program needs to be uninstalled. First, a judgment is made as to whether the licenses of all programs are revoked for all channel control portions 110 belonging to the cluster 180 or not (S1400).

When a decision is made in the step S1400 that the licenses of all programs are not revoked for all channel control portions 110 belonging to the cluster 180 (S1400: N), each channel control portion 110 revokes the license of a program that has not been revoked yet (S1401). Then, the number of remaining licenses on the license number information table stored in the shared LU 310 or the like is increased by one, and the status of use on the license status information table is altered to "Disable" (S1402). Specifically, when a decision is made that the license of "Program 3" is not revoked for the channel control portions 3 and 4 belonging to the cluster B 180, each of the channel control portion 3 and 4 (110) revokes the license of "Program 3". Then, the number of remaining licenses on the license number information table is increased by one, and the status of use corresponding to each channel control portion 110 on the license status information table is altered to "Disable".

When a decision is made in the step S1400 that the licenses of all programs are revoked for all channel control portions 110 belonging to the cluster 180 (S1400: Y), the license revoking process is terminated. This process is provided for revoking the licenses of programs for all channel control portions 110 belonging to the cluster 180 but not for deleting the set license key from the storage system 600. Accordingly, because the license key once set is managed by the storage system 600, it is unnecessary to set the license key again, so that the user's labor for entering the license key again can be omitted.

As described above, the process for uniformizing the program license setting states permits each program to be executed by any one of the channel control portions 110. Accordingly, because data processing that has been heretofore executed by a certain channel control portion 110 can be executed by another channel control portion 110, the user can be prevented from being thrown into confusion. Particularly when the cluster 180 is set, each program can be executed by any one of channel control portions 110 belonging to the cluster 180. As a result, there is no convenience even at the time of fail-over, so that the user can be prevented from being thrown into confusion.

According to the invention, there is shown an example in which license information is stored in the shared disk to achieve license management. Because license information is stored in the shared disk, license status and license information can be used continuously even in the case where programs are re-installed because of failure in a system disk. Furthermore, because license management can be centralized by one system, licenses can be moved easily while illegal use of the licenses can be prevented. In this manner, in accordance with the invention, the licenses of programs can be managed efficiently.

Incidentally, besides this embodiment, a method for synchronizing data among all channel control portions 110 by reflecting the data in the system LUs 310 may be included in the invention.

(Management of Program)

Each channel control portion 110 may carry out a process for uniformizing the states of the OS and application programs installed on the OS for respective channel control portions 110 before the channel control portion 110 carries out the process for uniformizing the program license setting states. For example, the process for uniformizing the program states is a process for uniformizing the presence of the OS and application programs installed on the OS for all channel control portions 110 in the storage system 600, the program versions, the program licenses, and so on. Although this embodiment has shown the case where this process is carried out by each channel control portion 110, this process may be carried by the management terminal 160.

For example, the process for uniformizing the program states is carried out in the case where there is the possibility that mismatch of the program states may occur at the time of starting of the system, at the time of execution of a program, at the time of starting of use of a program, at the time when an information processor 200 sets access limitation to allow the information processor 200 to access all channel control portions 110 in the storage system 600, at the time of setting of the cluster 180, at the time of setting of the license key of a program, or at the time of repairing of the system.

Figure 22:
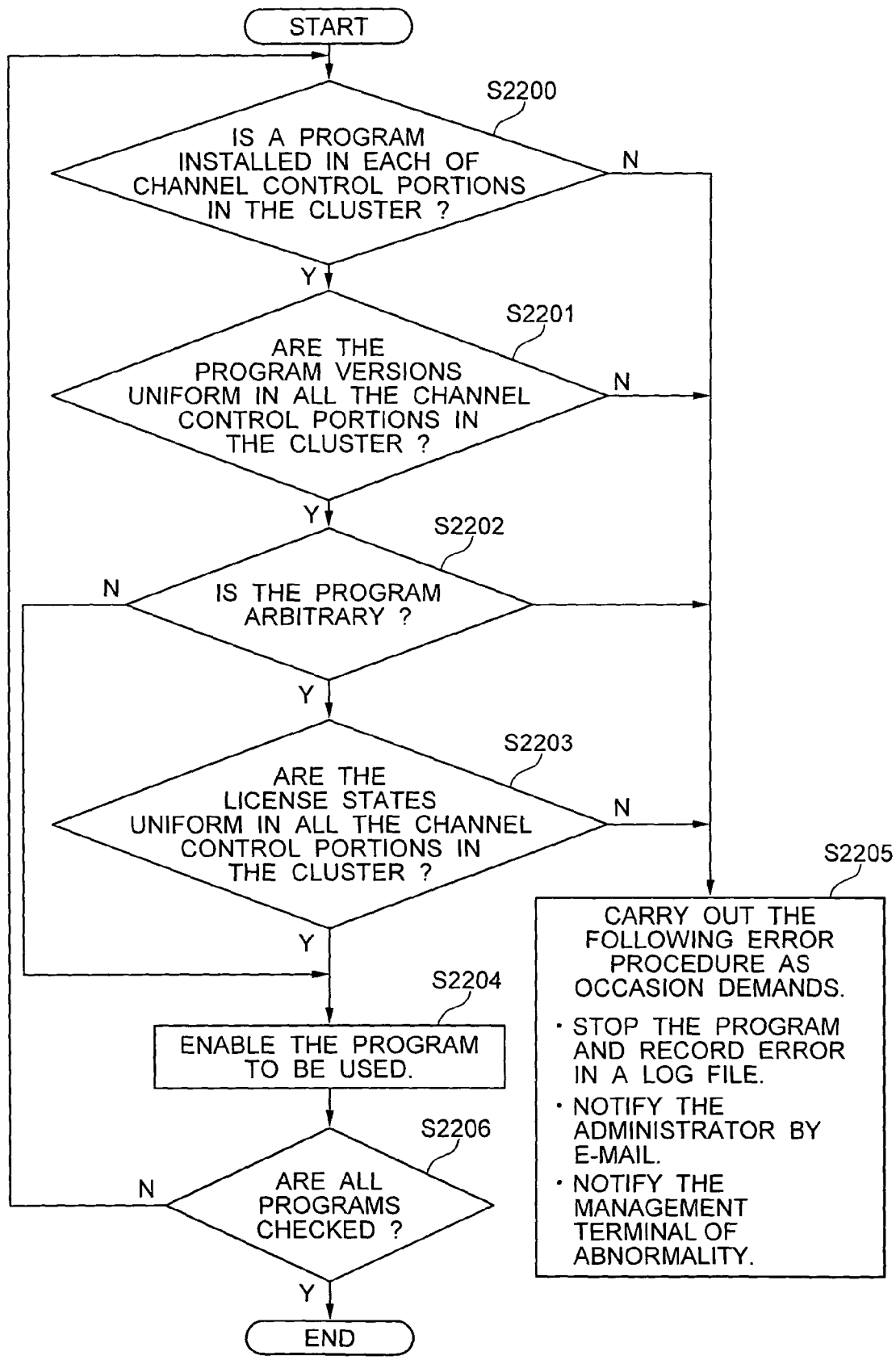
FIG. 22 is a flow chart for explaining a process for uniformizing program states in this embodiment.

FIG. 22 shows an example of the process for uniformizing the states of the OS and application programs installed on the OS for respective channel control portions 1 to 4 (110) in the case where clusters 180 are set as shown in FIG. 12.

When clusters 180 are set, each of channel control portions 1 and 2 (110) belonging to a cluster A 180 first checks the program status table and judges whether contents of a program installed in the system LUs (storage region) 310 assigned to the channel control portions 1 and 2 (110) belonging to the cluster A 180 are uniform or not (S2200). By this step S2200, program matching between the channel control portion 1 (110) and the channel control portion 2 (110) can be obtained. Accordingly, the program can operate normally without any disadvantage even in the case where the channel control portion 1 (110) is failed over to the channel control portion 2 (110).

FIG. 23 shows an example of the program status table. Information such as system identifier, cluster identifier, channel control portion identifier, program identifier, program type, version, status of use, etc. is stored on the program status table. Incidentally, the program status table is stored in the memories 113, the shared memory 120, the shared disk (shared LU) 310, etc.

When a decision is made in the step S2200 that contents of the installed program are uniform (S2200: Y), the program status table is checked and a judgment is made as to whether the versions of the installed program are uniform or not (S2201). On the other hand, when a decision is made in the step S2200 that contents of the installed programs are not uniform (S2200: N), the process jumps to step S2205.

In the step S2201, the program status table is checked and a judgment is made as to whether the versions of the installed program are uniform or not. If the versions of the program are not uniform, there is the possibility that results of processing executed by respective channel control portions 110 may differ from each other because system calls vary according to the difference in version when the channel control portion 1 (110) is failed over to the channel control portion 2 (110). For this reason, users are thrown into confusion. Therefore, this step S2201 is carried out so that all users can be prevented from being thrown into confusion.

When a decision is made in the step S2201 that the versions of the installed program are uniform (S2201: Y), the process goes to step S2202. On the other hand, when a decision is made in the step S2201 that the versions of the installed program are not uniform (S2201: N), the process jumps to step S2205.

In the step S2202, a judgment is made as to whether the installed program is an application program or not. The operating system may be licensed in advance because the operating system is a program essentially required for implementing the function of an NAS. Accordingly, in some case, license setting states need to be uniformized only for application programs. In this case, the step S2202 needs to be used. When license setting states are uniformized for all programs, the step S2202, however, need not be used.

When a decision is made in the step S2202 that the installed program is an application program (S2202: Y), the process goes to step S2203. On the other hand, when a decision is made in the step S2202 that the installed program is not an application program (S2202: N), the process jumps to step S2204.

In the step S2203, a judgment is made as to whether license setting states for all channel control portions belonging to the cluster 180 are uniform or not. If the application program is not licensed, the program cannot be used. Accordingly, there may occur a problem when the program is licensed for the channel control portion 1 (110) belonging to the cluster A 180 but not licensed for the channel control portion 2 (110) belonging to the cluster A 180. For example, there is a problem that data that have been processed by a certain program in the channel control portion 1 (110) cannot be processed in the channel control portion 2 (110). Therefore, this step S2203 is carried out so that all users can be prevented from being thrown into confusion.

When a decision is made in the step S2203 that license setting states are uniform (S2203: Y), the process goes to step S2204. On the other hand, when a decision is made in the step S2203 that license setting states are not uniform (S2203: N), the process jumps to step S2205.

In the step S2205, the program based on the decision that program states are not uniform is controlled to be disabled from being used, and information of mismatch of the program states is recorded in a log file. Further, as shown in FIG. 24, an error message (mismatch of program states) may be displayed on a display screen of the management terminal 160 or information processor 200 or may be sent by e-mail.

In the step S2204, the status of use on the license status information table or program status table is altered to "Enable" so that the program can be used. Then, the process goes to step S2206 in which a judgment is made as to whether all programs are checked about the items of the steps S2200 to S2203 or not. As a result, programs executed by all channel control portions 110 belonging to the cluster 180 to be set are uniformized. Accordingly, the cluster 180 can be set.

When a decision is made in the step S2206 that all programs are checked (S2206: Y), the program status uniformizing process is terminated. On the other hand, when a decision is made in the step S2206 that all programs are not checked (S2206: N), the process jumps to step S2200 in which a non-checked program is checked about the items of the steps S2200 to S2203.

As described above, even in the case where a channel control portion 110 belonging to a specific cluster 180 is failed over to another channel control portion 110 belonging to the specific cluster 180 when failure occurs in the channel control portion 110, the cluster function can be implemented so that programs can be executed by the destination of failover because the license states of the channel control portions 110 belonging to the cluster 180 are uniform.

Although an example of the storage system 600 configured to include a storage device controller 100 having a plurality of channel control portions 110 has been described above specifically, the invention may be also applied to a storage system 600 configured to include a plurality of storage device controllers 100 each having a channel control portion 110.

According to the invention, management of presence/absence of installation of programs and management of versions of programs as well as efficient management of licenses of programs can be carried out.

Although the embodiment has been described above, the embodiment is provided for facilitating understanding of the invention but not for interpreting the invention restrictively. The invention may be changed or modified without departing from the gist of the invention, and may contain changes or modifications equivalent thereto.

What is claimed is:

1. A method of controlling a storage system for managing licenses given to a cluster which includes channel control portions for exchanging data input/output requests based on designation of filenames with information processors connected to said storage system through a network, storage regions assigned to said channel control portions so as to be able to be accessed by said channel control portions respectively, and storage devices provided with said storage regions, said method comprising:

registering a license key including information of an application program identifier, a version, a number of licenses and the licenses' period for each application program among a plurality of application programs that are licensed for use in channel control portions included in each cluster among a plurality of clusters in said storage system to set in a license table in a shared LU of said storage devices when said application programs are installed in a LU of said storage devices;

deciding whether or not program status including the version and the application program identifier is uniform with a version and an application program identifier of a license key of any one of said application programs already registered in said storage system and revoking, when the deciding proved to be false, the license key registered, otherwise proceeding to the following:

judging, when a data input/output request is received in one of said channel control portions of one of said clusters, whether or not a license is set in said license table for an application program installed in said storage regions assigned to said one of said channel control portions in order to allow said application program to be used in said one of said channel control portions;

extracting, when the judging proved to be true, a number of channel control portions of said one of said clusters in which said application program is not licensed;

requesting to accept entry of a license key for said application program when a number of remaining licenses is smaller than said number of channel control portions;

adding a license number that can be newly set for said channel control portions of said one of said clusters based on said entry of said license key, to said first license number thereby to obtain a sum;

displaying an error when said sum is smaller than said number of channel control portions, otherwise proceeding to the following:

altering said number of licenses with said sum in said license table;

configuring first and second channel control portions from among said channel control portions of said one of said clusters to form a cluster;

setting information in said license table to make uniform said versions of application programs executed by said first and second channel control portions; and performing control so that said channel control portions can use said application program.

2. A method of controlling a storage system according to claim 1, wherein setting is made so that processing executed by said first channel control portion is handed over to said second channel control portion when failure occurs in said first channel control portion.

3. A storage system for managing licenses given to a cluster comprising:

a plurality of channel control portions included in each cluster among a plurality of clusters for exchanging data input/output requests based on designation of filenames with information processors connected to said storage system through a network;

a plurality of storage regions assigned to said channel control portions of each of said clusters so as to be able to be accessed by said channel control portions respectively;

a plurality of storage devices provided with said storage regions;

means for registering a license key including information of an application program identifier, a version, a number of licenses and the licenses' period for each application program among a plurality of application programs that are licensed for use in each of said clusters in said storage system to set in a license table in a shared LU of said storage devices when said application programs are installed in a LU of said storage devices;

means for deciding whether or not program status including the version and the application program identifier are uniform with a version and an application program identifier of a license key of any one of said application programs already registered in said storage system and revoking, when the deciding proved to be false, the license key registered;

wherein said means for deciding includes means, which works when the deciding proved to be true, comprising:

means for judging, when a data input/output request is received in one of said channel control portions of one of said clusters, whether or not a license is set in said license table for an application program installed in said storage regions assigned to said one of said channel control portions in order to allow said application program to be used in said one of said channel control portions;

means for extracting, when the judging proved to be true, a number of channel control portions of said one of said clusters in which said application program is not licensed;

means for requesting to accept entry of a license key for said application program when a number of remaining licenses is smaller than said number of channel control portions;

means for adding a license number that can be newly set for said channel control portions of said one of said clusters based on said entry of said license key, to said first license number thereby to obtain a sum;

means for displaying an error when said sum is smaller than said number of said channel control portions;

wherein said means for displaying includes means, which works when said sum is not smaller than said number of said channel control portions, comprising:

means for altering said number of licenses with said sum in said license table;

means for configuring first and second channel control portions from among said channel control portions to form a cluster;

means for setting information in said license table to make uniform said versions of application programs executed by said first and second channel control portions; and means for performing control so that said channel control portions can use said application program.

4. A recording medium having program codes read by a computer to run thereon, said computer being connected to a storage system which includes channel control portions for exchanging data input/output requests based on designation of filenames with information processors connected to said storage system through a network, storage regions assigned to said channel control portions so as to be able to be accessed by said channel control portions respectively, and storage devices with said storage regions, said program codes comprising instructions that cause the computer to perform:

registering a license key including information of an application program identifier, a version, a number of licenses and the licenses' period for each application program among a plurality of application programs that are licensed for use in said storage system to set in a license table in a shared LU of said storage devices when said application programs are installed in a LU of said storage devices;

deciding whether or not program status including the version and the application program identifier is uniform with a version and an application program identifier of a license key of any one of said application programs already registered in said storage system and revoking, when the deciding proved to be false, the license key registered, otherwise proceeding to the following:

judging, when a data input/output request is received in one of said channel control portions of one of said clusters, whether or not a license is set in said license table for an application program installed in said storage regions assigned to said one of said channel control portions in order to allow said application program to be used in said one of said channel control portions;

extracting, when the judging proved to be true, a number of channel control portions of said one of said clusters in which said application program is not licensed;

requesting to accept entry of a license key for said application program when a number of remaining licenses is smaller than said number of channel control portions;

adding a license number that can be newly set for said channel control portions of said one of said clusters based on said entry of said license key, to said first license number thereby to obtain a sum;

displaying an error when said sum is smaller than said number of channel control portions, otherwise proceeding to the following:

altering said number of licenses with said sum in said license table;

configuring first and second channel control portions from among said channel control portions of said one of said clusters to form a cluster;

setting information in said license table to make uniform said versions of application programs executed by said first and second channel control portions; and performing control so that said channel control portions can use said application program.

* * * * *